(12) United States Patent
Hundley et al.

(10) Patent No.: US 11,937,735 B2
(45) Date of Patent: Mar. 26, 2024

(54) RECONFIGURABLE FOOD WARMING ASSEMBLY

(71) Applicant: The Vollrath Company, L.L.C., Sheboygan, WI (US)

(72) Inventors: Jill Hundley, Sheboygan, WI (US); Thomas David VanDerPuy, Sheboygan, WI (US); Jeffrey T. Zank, Germantown, WI (US); Kirk Michael Komendat, West Henrietta, NY (US); Kristin Blada, Howards Grove, WI (US); Ian Robert Ecclestone, Oostburg, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 736 days.

(21) Appl. No.: 16/988,186

(22) Filed: Aug. 7, 2020

(65) Prior Publication Data

US 2021/0038018 A1    Feb. 11, 2021

Related U.S. Application Data

(60) Provisional application No. 62/884,232, filed on Aug. 8, 2019.

(51) Int. Cl.
*A47J 36/24*      (2006.01)
*H05B 3/00*      (2006.01)

(52) U.S. Cl.
CPC ........ *A47J 36/2483* (2013.01); *H05B 3/0076* (2013.01)

(58) Field of Classification Search
CPC .......................... F21V 21/005; H05B 3/0076
See application file for complete search history.

(56) References Cited

U.S. PATENT DOCUMENTS

| | | | | |
|---|---|---|---|---|
| 1,945,196 A | * | 1/1934 | Kelly | A47J 37/00 366/144 |
| 2,738,410 A | * | 3/1956 | Ness | A47J 36/2483 219/518 |

(Continued)

OTHER PUBLICATIONS

Hatco Presents . . . Mounting Options for GR5 Strip Heaters. https://www.youtube.com/watch?v=JUERau3Q64w posted Feb. 18, 2020. (Year: 2020).*

(Continued)

*Primary Examiner* — Sean M Michalski
(74) *Attorney, Agent, or Firm* — Foley & Lardner LLP

(57) ABSTRACT

A food station includes a base configured to support a food product, a frame coupled to the base and including a longitudinal member having a length extending in a longitudinal direction, and a heat strip module coupled to the longitudinal member. The heat strip module includes a housing, a heating element coupled to the housing, and a reflector coupled to the housing. The heat strip module is at least one of (a) selectively rotatable relative to the longitudinal member between a first orientation and a second orientation and configured to emit the energy in both the first orientation and the second orientation or (b) selectively repositionable along the length of the longitudinal member between a first position and a second position and configured to emit the energy in both the first position and the second position.

15 Claims, 34 Drawing Sheets

(56) References Cited

U.S. PATENT DOCUMENTS

| | | | | |
|---|---|---|---|---|
| 2,863,979 A * | 12/1958 | Fitzgerald | A47J 36/2483 | 219/403 |
| 3,014,680 A * | 12/1961 | Steinbach | F24D 13/02 | 248/50 |
| 3,038,986 A * | 6/1962 | Molitor | A47B 31/02 | 126/33 |
| 3,120,599 A * | 2/1964 | Hilgers | F24C 7/06 | 219/214 |
| 3,559,146 A | 1/1971 | Valtonen | | |
| 3,757,273 A | 9/1973 | Hesse | | |
| 4,053,194 A | 10/1977 | Gilman | | |
| 4,074,108 A * | 2/1978 | King | H05B 3/00 | 219/214 |
| 4,119,834 A * | 10/1978 | Losch | H05B 3/0076 | 219/214 |
| 4,258,413 A * | 3/1981 | Mausser | F21S 8/04 | 362/147 |
| 4,343,985 A * | 8/1982 | Wilson | A47J 36/2488 | 219/214 |
| 4,727,854 A * | 3/1988 | Johnson | F24C 1/10 | 126/91 A |
| 4,733,054 A * | 3/1988 | Paul | A47J 36/2488 | 219/385 |
| 4,784,054 A * | 11/1988 | Karos | A47J 39/006 | 219/214 |
| 4,822,292 A | 4/1989 | Thayer et al. | | |
| 4,822,981 A * | 4/1989 | Chaudoir | A47J 36/2483 | 219/214 |
| 4,979,491 A * | 12/1990 | DeMeritt | F24D 5/08 | 126/91 A |
| 4,990,749 A * | 2/1991 | Devine | A47J 36/2483 | 392/407 |
| 5,226,724 A * | 7/1993 | Kanarek | F21V 15/013 | 362/151 |
| 5,771,789 A * | 6/1998 | Davis | A47F 3/0495 | 126/369 |
| 5,803,755 A | 9/1998 | Kuchar et al. | | |
| 6,170,967 B1 * | 1/2001 | Usher | F21V 21/35 | 200/227 |
| 6,231,215 B1 * | 5/2001 | Spitler | F21V 21/30 | 362/396 |
| 6,373,030 B1 * | 4/2002 | Waldrep | F24C 7/06 | 392/416 |
| 6,414,283 B1 * | 7/2002 | McNamara | G01K 13/10 | 219/486 |
| 6,739,740 B1 * | 5/2004 | Feldman | F21V 21/34 | 362/147 |
| 7,067,773 B2 | 6/2006 | DeWitt | | |
| 7,661,870 B2 * | 2/2010 | Mobarak | H01R 25/142 | 439/111 |
| 8,171,845 B2 | 5/2012 | Hartsfield et al. | | |
| 8,692,160 B2 * | 4/2014 | Brown | A47F 10/06 | 219/520 |
| 8,761,588 B2 * | 6/2014 | Lee | A47J 37/0629 | 219/385 |
| 8,851,717 B2 * | 10/2014 | Verbrugh | F21S 8/04 | 362/398 |
| 9,557,004 B1 | 1/2017 | Mcgrath | | |
| D819,400 S | 6/2018 | Scanlon et al. | | |
| 10,359,187 B2 | 7/2019 | Scanlon et al. | | |
| 10,876,717 B1 * | 12/2020 | Parker | F21S 8/026 | |
| 2002/0043906 A1 | 4/2002 | Dewitt et al. | | |
| 2003/0057810 A1 | 3/2003 | DeWitt | | |
| 2008/0283440 A1 | 11/2008 | Hartsfield et al. | | |
| 2009/0303739 A1 * | 12/2009 | Garcia | B60Q 3/88 | 362/220 |
| 2011/0193453 A1 | 8/2011 | Matus, Jr. | | |
| 2011/0277644 A1 * | 11/2011 | Frauenfeld | A47F 10/06 | 99/483 |
| 2011/0283895 A1 * | 11/2011 | Veltrop | A23L 5/15 | 392/416 |
| 2012/0075857 A1 * | 3/2012 | Verbrugh | F21S 8/04 | 362/398 |
| 2014/0096689 A1 * | 4/2014 | Stolle | A47J 39/006 | 99/483 |
| 2014/0097355 A1 * | 4/2014 | Stolle | A23L 3/28 | 250/455.11 |
| 2014/0217906 A1 * | 8/2014 | Vo | H05B 47/195 | 315/149 |
| 2015/0308642 A1 * | 10/2015 | Vo | H04N 23/56 | 362/648 |
| 2018/0119946 A1 * | 5/2018 | Schubert | A01K 31/20 | |
| 2022/0322870 A1 * | 10/2022 | Baarman | A47J 36/2483 | |

OTHER PUBLICATIONS

Hatco, Strip Heater Solutions Brochure, 37 pages, dated Jan. 2018.

* cited by examiner

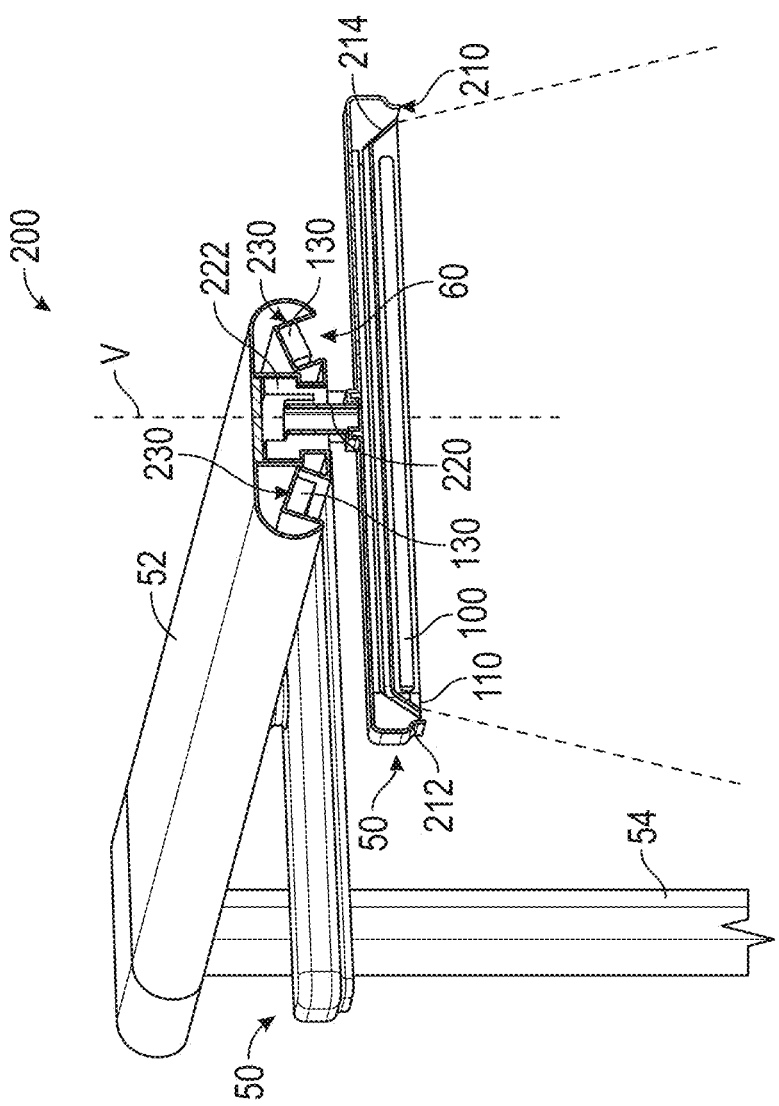
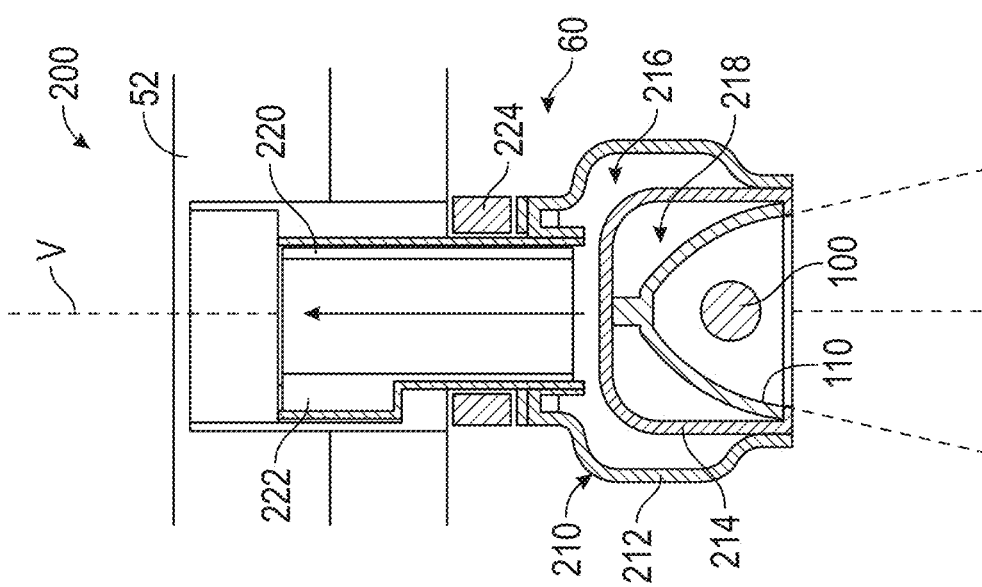
FIG. 6
FIG. 5

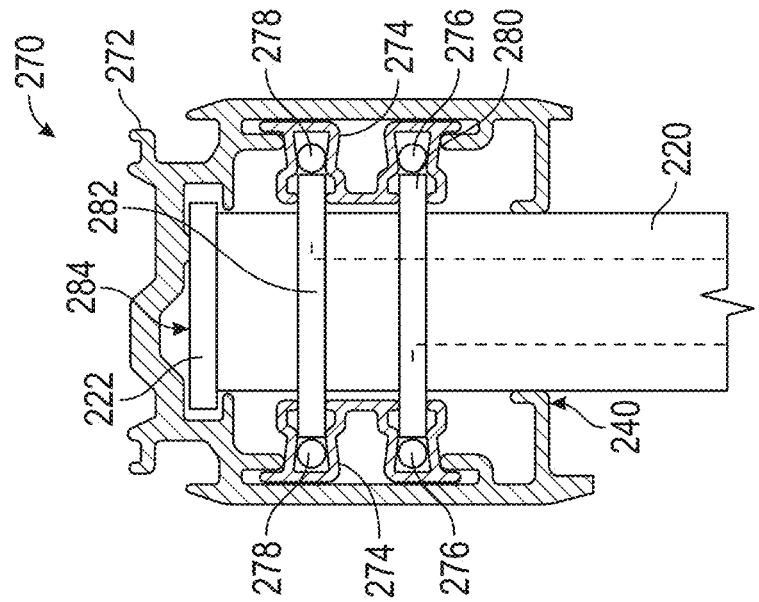
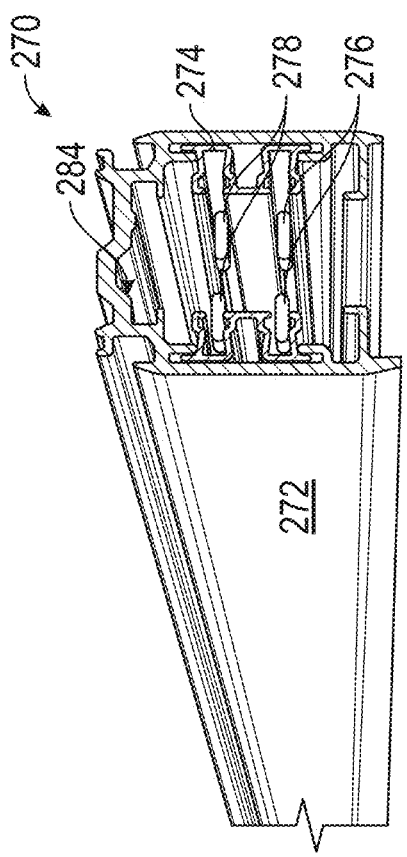
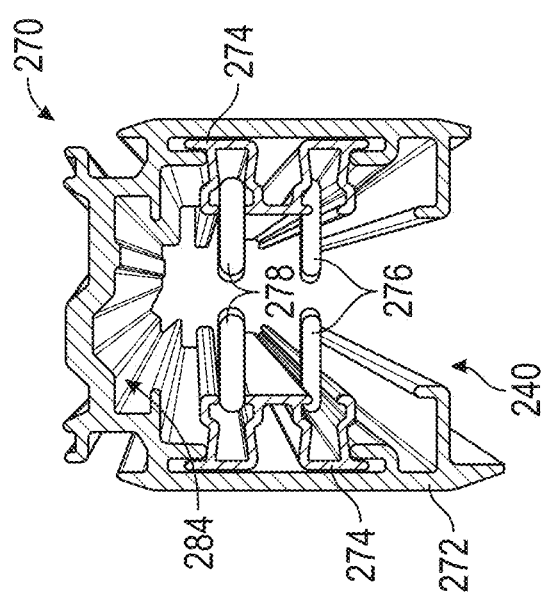

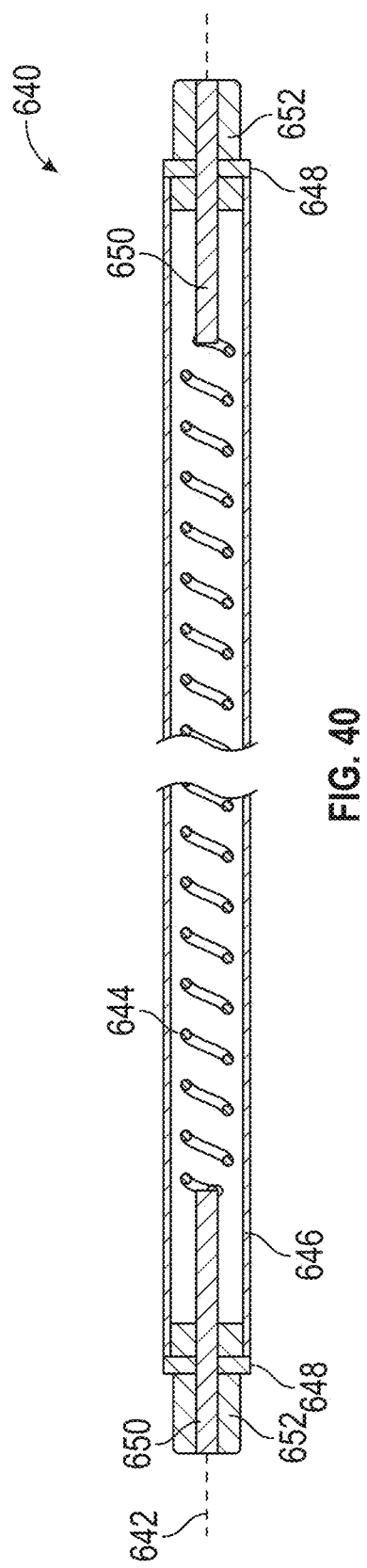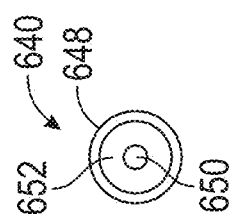
FIG. 40
FIG. 41

RECONFIGURABLE FOOD WARMING ASSEMBLY

CROSS-REFERENCE TO RELATED PATENT APPLICATION

This application claims the benefit of U.S. Provisional Patent Application No. 62/884,232, filed Aug. 8, 2019, which is hereby incorporated herein by reference in its entirety.

BACKGROUND

The present disclosure relates generally to the field of food warming devices. More specifically, the present disclosure relates to strip heaters for warming food products.

Strip heaters are used to warm food products, retaining the food products at a desired temperature for extended periods of time (e.g., with food stations prior to serving, while the food products are on display, while the food products are midway through a preparation process, etc.). The strip heaters are elongate and provide thermal energy to objects positioned within a predetermined area below the strip heater. By way of example, the strip heater may produce infrared electromagnetic waves that are absorbed the objects, warming the objects.

SUMMARY

At least one embodiment relates to a food station including a base configured to support a food product, a frame coupled to the base, the frame including a longitudinal member having a length extending in a longitudinal direction, and a heat strip module coupled to the longitudinal member. The heat strip module includes a housing, a heating element coupled to the housing and configured to emit energy downward toward the food product to heat the food product, and a reflector coupled to the housing and configured to redirect a portion of the energy emitted by the heating element toward the food product. The heat strip module is at least one of (a) selectively rotatable relative to the longitudinal member between a first orientation and a second orientation and configured to emit the energy in both the first orientation and the second orientation or (b) selectively repositionable along the length of the longitudinal member between a first position and a second position and configured to emit the energy in both the first position and the second position.

Another embodiment relates to a strip heater for heating food products. The strip heater includes a housing, a first clip coupled to the housing and defining a first recess, a second clip coupled to the housing and defining a second recess, and a heating element having a first end portion and a second end portion. The first end portion is received by the first recess and the second end portion is received by the second recess such that the clips removably couple the heating element to the housing. The strip heater is configured to direct an electrical current from a power source through the first clip, the heating element, and the second clip to power the heating element.

Another embodiment relates to a food station including a base configured to support a food product, a frame coupled to the base, and a heater module coupled to the frame. The heater module includes a housing, a heating element, and a pair of clips removably coupling the heating element to the housing such that the heating element is removable from the housing without the use of tools. The heater module is at least one of (a) selectively rotatable relative to the frame about a substantially vertical axis between a first orientation and a second orientation or (b) selectively repositionable relative to the frame between a first position and a second position, the first position being longitudinally spaced from the second position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 5 and 6 are section views of the food serving station of FIG. 3.

FIG. 14 is a perspective section view of a power track assembly of a food serving station, according to an exemplary embodiment.

FIGS. 15 and 16 are front section views of the power track assembly of FIG. 14.

FIGS. 40 and 41 are various views of a heating element of the heat strip module of FIG. 29.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
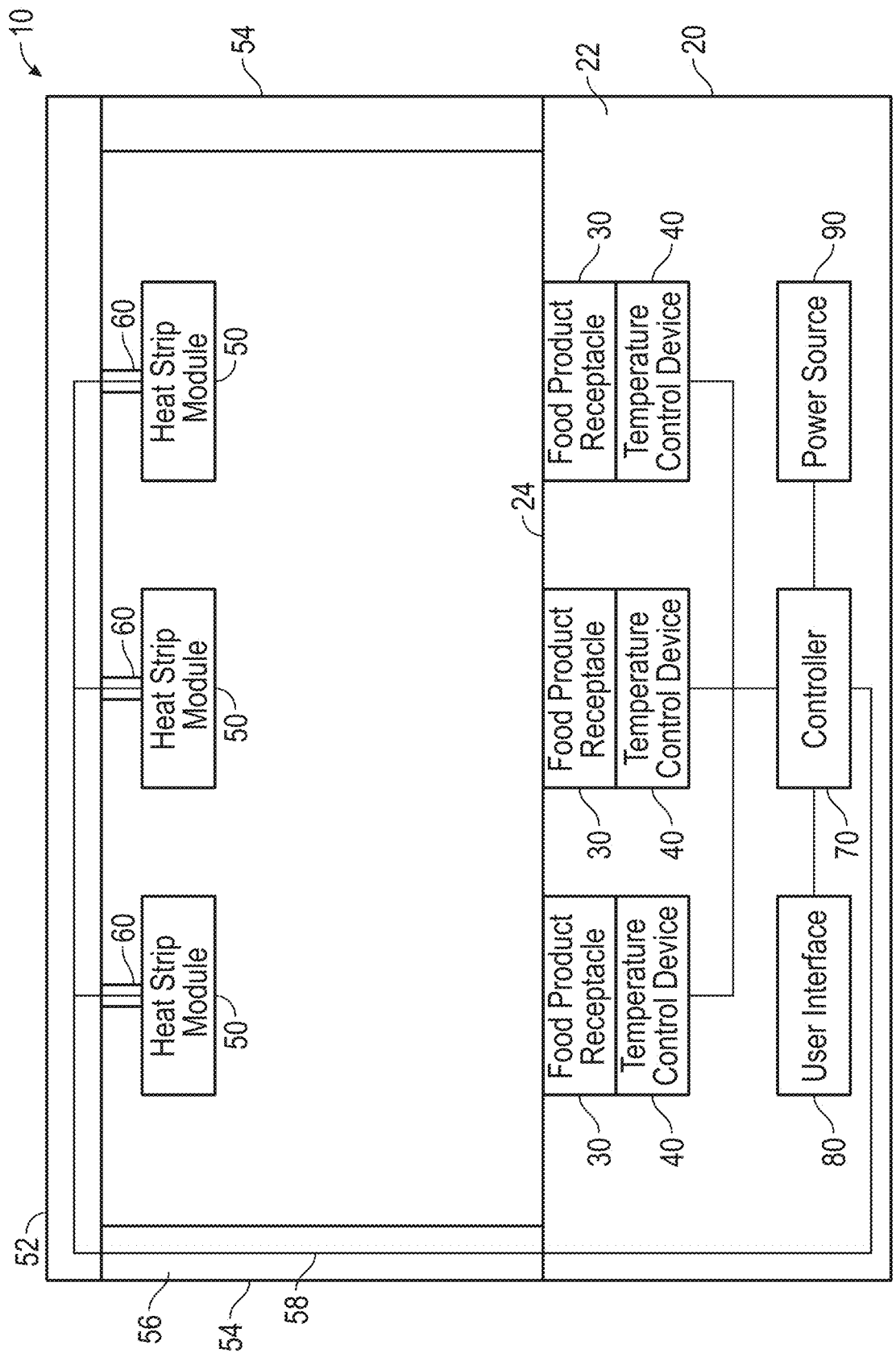
FIG. 1 is a block diagram of a food station (shown as a food serving station), according to an exemplary embodiment.
Figure 2:
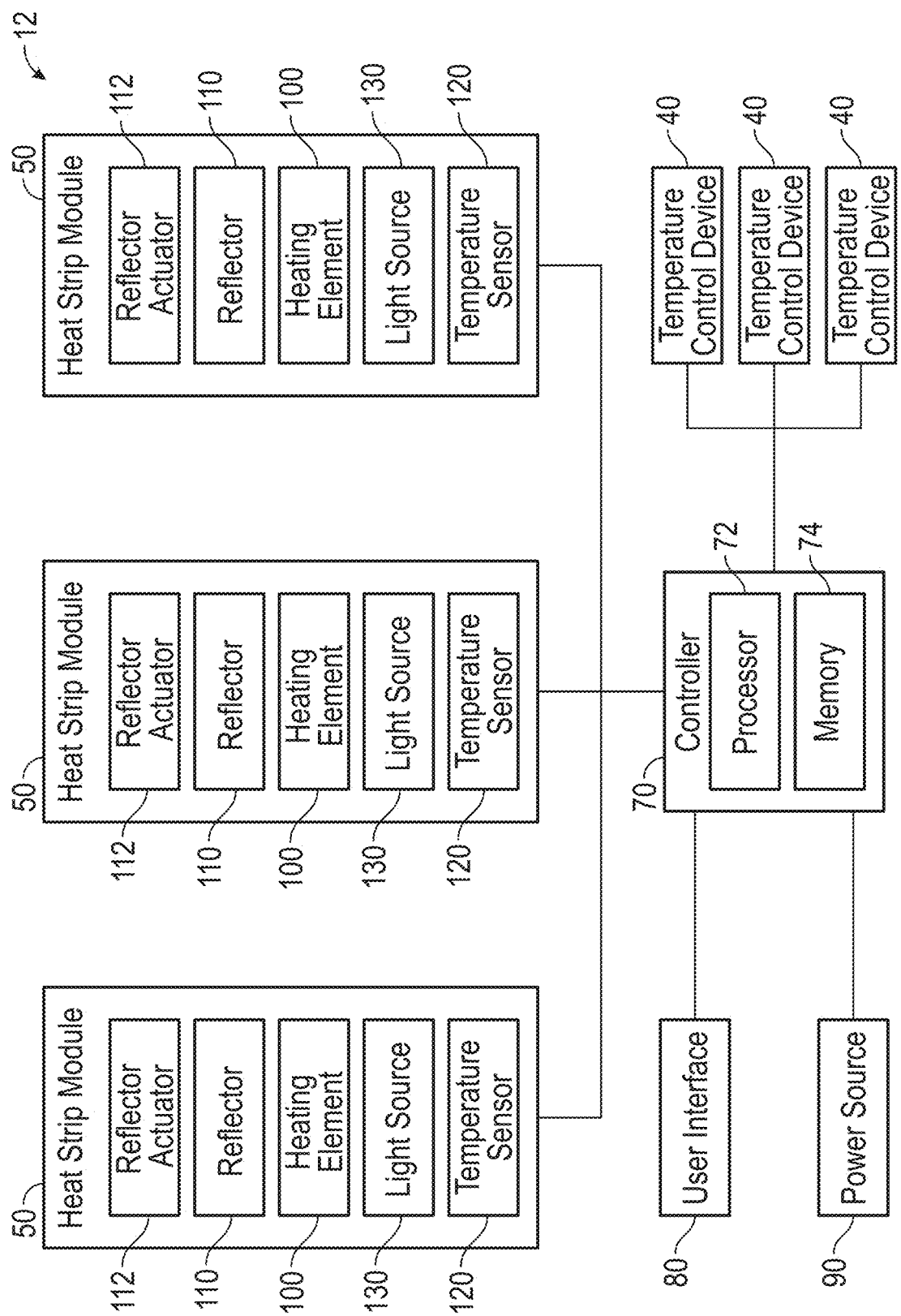
FIG. 2 is a block diagram of a control system of a food serving station.

Referring to FIG. 1, an assembly (e.g., a buffet station, a food serving station, a food storage station, a food warming station, a pass-through window, an open counter, etc.) is shown as food serving station 10 according to an exemplary embodiment. It should be understood that the food serving station 10 may be any type of food station configured to support, serve, display, or otherwise come into contact with food products. FIG. 2 illustrates a control system 12 of the food serving station 10, according to an exemplary embodiment. The food serving station 10 is configured to facilitate the storage and display of food products at a desired temperature. The food serving station 10 includes a chassis, shown as base 20. The base 20 may be stationary (e.g., built into a fixed, permanent location within a kitchen or dining space, etc.) or mobile (e.g., arranged on casters to facilitate movement of the food serving station 10 between different rooms, etc.). The base 20 includes a housing 22 that stores one or more components of the food serving station 10. The housing 22 has a top surface, shown as counter 24. The counter 24 may be used to support one or more food products.

Figure 3:
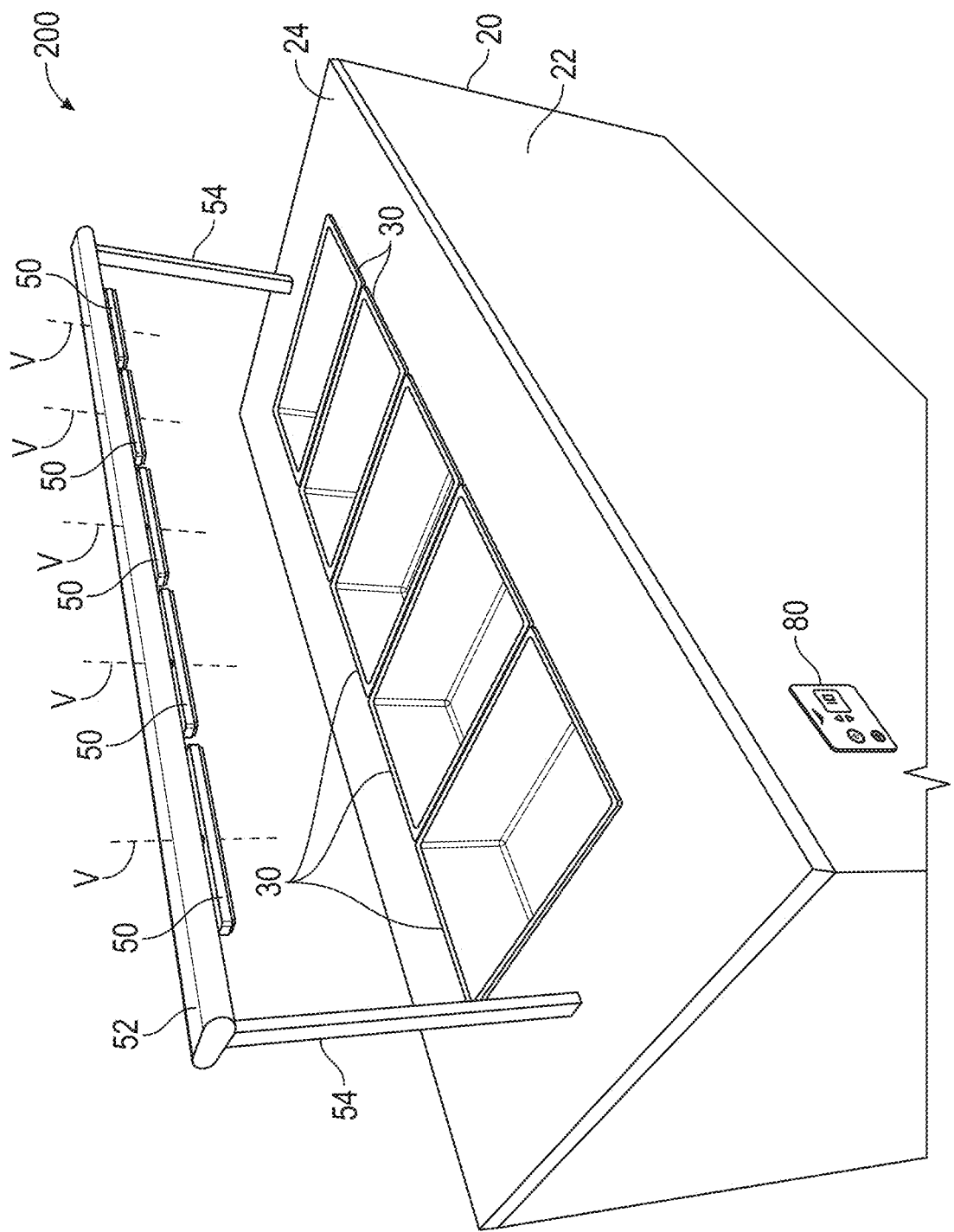
FIGS. 3 and 4 are perspective views of a food serving station in various configurations, according to an exemplary embodiment.
Figure 4:
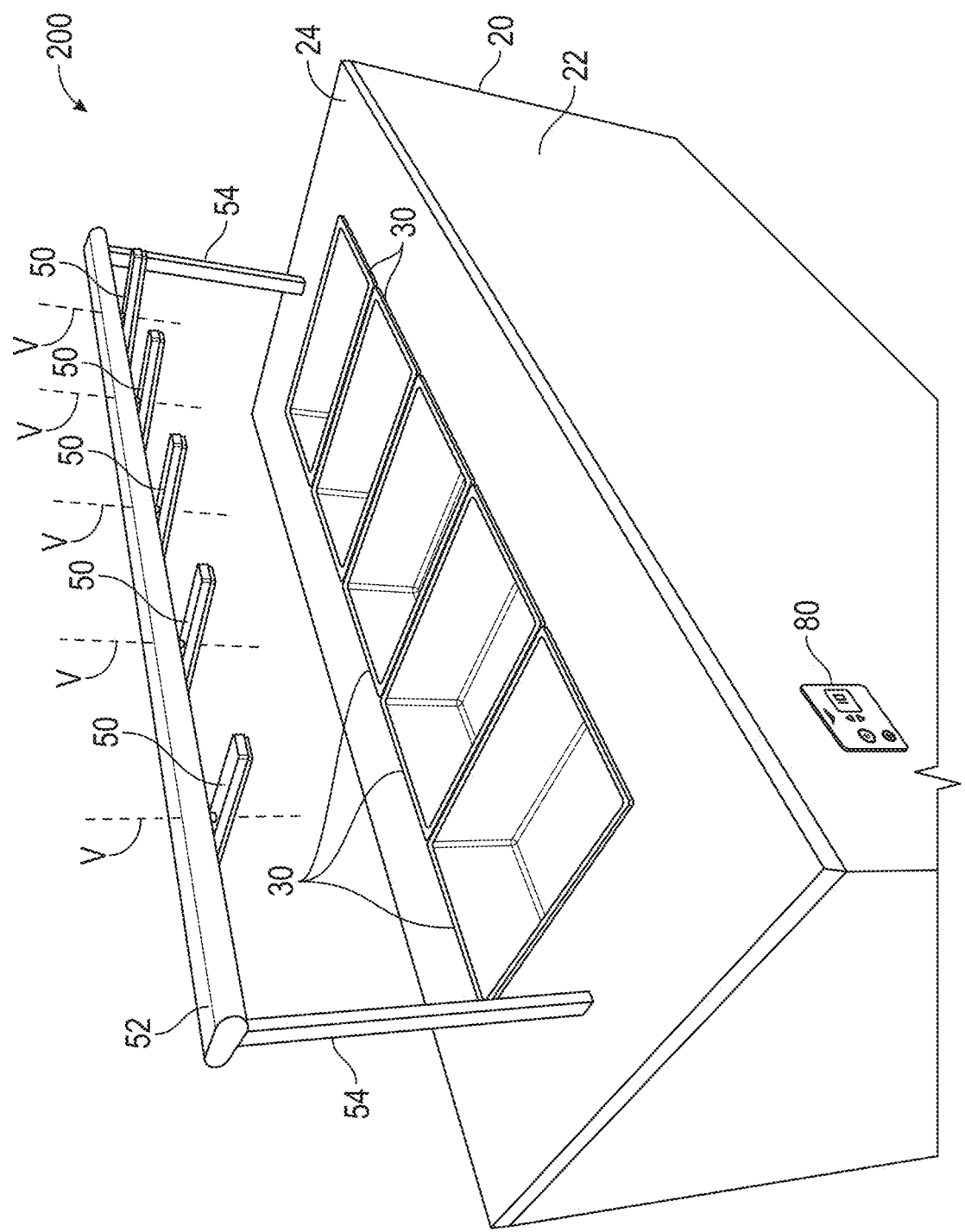

The base 20 contains one or more containers, surfaces, or receptacles, shown as food product receptacles 30. The food product receptacles 30 are configured to receive and/or support one or more food products. The food product receptacles 30 may include pans (e.g., as shown in FIGS. 3 and 4), trays, pots (e.g., for containing liquids, such as soup), racks, or another type of device. The food product receptacles 30 may be configured to store solid food products, liquid food products, or a combination thereof. The food product receptacles 30 may be fixed in place or removable (e.g., for cleaning). In some embodiments, the food product receptacles 30 are removable and repositionable to reconfigure the food serving station 10. By way of example, in a first configuration, the food serving station 10 may include two pans, each pan having a recess configured to store a different type of food product (e.g., egg rolls and dumplings, etc.). In a second configuration, the pans may be removed and replaced with a single flat tray configured to store pizzas.

One or more of the food product receptacles 30 may have an associated temperature control device 40 (e.g., a temperature controller) that is configured to control (e.g., increase, decrease, maintain, etc.) a temperature of the corresponding food product receptacles 30 and the food products contained therein. By way of example, the temperature control device 40 may include a heater configured to provide thermal energy to the food product receptacle 30 (e.g., a resistive heater, an induction heater, a heating element, a natural gas burner, etc.). By way of another example, the temperature control device 40 may include a cooler configured to remove thermal energy from the food product receptacle 30 (e.g., a refrigeration circuit, a refrigerator, a freezer, etc.). In some embodiments, the temperature control device 40 is selectively reconfigurable between heating and cooling. By way of example, the temperature control device 40 may include a single system that is capable of heating and cooling (e.g., a heat pump). By way of example, the temperature control device 40 may include separate systems for heating and cooling, and may selectively activate each one based on an operating mode of the food serving station 10 (e.g., a cooling mode, a heating mode, etc.). A temperature control device 40 may control the temperature of multiple food product receptacles 30, or each temperature control device 40 may control the temperature of only one food product receptacle 30. In other embodiments, the temperature control devices 40 are omitted.

The food serving station 10 further includes one or more reconfigurable food warming assemblies, elongated heating elements, heat strips, strip heating elements, strip heater modules, heat lamps, infrared heaters, or food warmers, shown as heat strip modules 50. Although FIG. 1 shows the food serving station 10 as including three heat strip modules 50, the food serving station 10 may include more or fewer heat strip modules 50. The heat strip modules 50 are positioned above the food product receptacles 30 and configured to supply thermal energy to the food products located within or atop the food product receptacles 30. As shown in FIG. 1, the heat strip modules 50 are coupled to a horizontal bar or track, shown as track 52. The track 52 extends substantially parallel to the counter 24. The track 52 is coupled to and supported by one or more vertical supports, shown as uprights 54. The uprights 54 are coupled to the base 20 and extend upward from the counter 24. In some embodiments, one or more of the uprights 54 define an internal volume or passage 56 (e.g., are tubular), through which one or more electrical connections, shown as wires 58 pass. By way of example, the wires 58 may transfer communications and/or electrical energy between the heat strip modules 50 and one or more components contained within the base 20. The heat strip modules 50 are each coupled to the track 52 by a coupler (e.g., a neck, a post, a junction, etc.), shown as coupler 60. Together, the uprights 54 and the track 52 form a frame assembly or chassis that supports the heat strip modules above the base 20.

Referring again to FIGS. 1 and 2, the food serving station 10 includes a controller 70. The controller 70 includes a control circuit or processing circuit, shown as processor 72, and a memory device, shown as memory 74. The processor 72 is configured to provide commands to control various systems of the food serving station 10 (e.g., the temperature control devices 40, the heat strip modules 50, the light sources 130, etc.). The memory 74 may store control logic for execution by the processor 72.

The food serving station 10 further includes an input and/or output device, shown as user interface 80, operatively coupled to the controller 70. The user interface 80 may be configured to receive information (e.g., commands, settings, etc.) from a user. The user interface 80 may include buttons, knobs, levers, touch screens, microphones, touch pads, switches, or other types of input devices. The user interface 80 may additionally or alternatively provide information (e.g., the current operating mode, a status of the food serving station 10, etc.) to a user. The user interface 80 may include displays, lights, speakers, haptic feedback devices (e.g., vibrating motors, etc.), or other types of output devices. In some embodiments, the user interface 80 is coupled to the base 20 (e.g., as shown in FIG. 3). In some embodiments, the user interface 80 is a separate device. By way of example, the user interface 80 may include a user device (e.g., a smartphone, a tablet, a computer, etc.) in communication with the controller 70. Such communication may be wired or wireless (e.g., through Bluetooth or Wi-Fi, over a cellular network, etc.).

The food serving station 10 further includes an energy source, shown as power source 90, configured to provide energy to power the food serving station 10. The power source 90 may be configured to provide electrical energy, chemical energy (e.g., a supply of natural gas, etc.), and/or another type of energy. The power source 90 may include onboard power sources (e.g., batteries, a solar panel, a generator, etc.) or offboard power sources (e.g., a cable that electrically couples the food serving station 10 to a power grid, etc.). The food serving station 10 may power systems of the food serving station 10 (e.g., the heat strip modules 50, the temperature control devices 40, the controller 70, etc.) directly or through another component (e.g., the controller 70).

Referring to FIG. 2, each heat strip module 50 includes one or more thermal energy generators, thermal energy sources, or heat lamps, shown as heating elements 100. The heating elements 100 are configured to consume energy from the power source 90 and emit energy (e.g., in the form of infrared light) to provide thermal energy to increase the temperature of food products stored in a corresponding food product receptacle 30. By way of example, the heating element 100 may include a resistive element that is configured to consume electrical energy to increase in temperature. The heated element emits infrared light, which is absorbed by food products and converted to thermal energy, warming the food products. In one such embodiment, each heat strip module 50 consumes approximately 306-400 watts of electrical energy at approximately 3.3 amps of current. In other embodiments, the heating element 100 includes a different type of thermal energy generator, such as a propane burner.

In some embodiments, the heating element 100 has a variable output level (i.e., can vary the amount of thermal energy that it provides). The output level may be controlled by the controller 70. By way of example, the heating element 100 may output energy at a fixed rate when turned on, and the controller 70 may vary the output level by selectively varying a ratio between the time that the heating element 100 is on (i.e., an on time) and the time that the heating element 100 is off (i.e., an off time) within a predetermined time period. In one such example, the controller 70 may control the heating element 100 to reach a 60% output level by ensuring that the heating element 100 has a 0.6 second on time for every 1 second period. The rate at which the controller 70 turns the heating element 100 on and off may vary between different embodiments. By way of another example, the controller 70 may vary the output level of the heating element 100 by varying a voltage or a current supplied to the heating element 100. In one such example, the heating element 100 may be configured to receive electrical energy between 0 V and 120 V. The controller 70 may set the output level at 50% by supplying 60V to the heating element 100. In other embodiments, the controller 70 has a fixed output level.

In some embodiments, each heat strip module 50 includes a reflector 110 configured to redirect some or all of the energy emitted by the heating element 100 downward toward the food products below the heat strip module 50. The heat strip module 50 may be made from and/or coated with a reflective material this is configured to reflect a large portion of the energy emitted by the heating element 100 as opposed to absorbing the energy and becoming heated itself. The reflector 110 may be shaped to direct the energy in a specific pattern. By way of example, the reflector 110 may be concave, and the heating element 100 may be positioned within the concave portion of the reflector 110. In some embodiments, the reflector 110 has a substantially parabolic cross-section.

In some embodiments, one or more of the heat strip modules 50 include an actuator (e.g., an electric motor, a pneumatic actuator, a hydraulic actuator, a manual actuator, etc.), shown as reflector actuator 112, configured to vary the pattern of the energy emitted from the heat strip module 50. The reflector 110 may be configured to vary the shape of the reflector 110 (e.g., by bending the reflector 110, by exposing an additional section of the reflector 110 to the heating element 100, etc.). Additionally or alternatively, the reflector actuator 112 may be configured to vary a position and/or orientation of the reflector 110 relative to the heating element 100. Accordingly, the reflector actuator 112 may be configured to vary a shape and/or size of the area heated by the heat strip module 50 and/or to vary the distribution of the energy within the area. By way of example, the reflector actuator 112 may widen or narrow the area heated by the heat strip module 50. By way of another example, the reflector actuator 112 may concentrate the energy emitted by the heat strip module 50 within a certain portion of the area heated by the heat strip module 50. The reflector actuator 112 may be controlled by controller 70 (e.g., by electronically activating a motor, etc.) and/or manually by a user (e.g., by interacting with a crank, etc.). In other embodiments, the reflector actuator 112 is omitted.

In some embodiments, the control system 12 includes a thermal sensor, shown as temperature sensor 120. The temperature sensor 120 is configured to provide a signal indicative of a temperature of a surface that is heated by the heat strip module 50 (e.g., a surface of the food product receptacle 30, a surface of a food product, etc.). In some embodiments, the temperature sensor 120 is built into the heat strip module 50, the track 52, an upright 54, and/or another elevated member and measures the temperature remotely. By way of example, the temperature sensor 120 may include an infrared temperature sensor that is configured to measure temperatures remotely. In some embodiments, the temperature sensor 120 directly measures the temperature. By way of example, the temperature sensor may include a thermocouple or resistance temperature detector that is coupled to the food product receptacle 30.

The controller 70 may be configured to perform closed-loop control of the temperature of the surface using the signal from the temperature sensor 120. By way of example, a user may indicate a target temperature using the user interface 80, and the controller 70 may control the output of the corresponding heating element 100 (e.g., to output more energy, to output less energy, etc.) based on the difference between the sensed temperature and the target temperature. In some embodiments, the temperature sensor 120 is omitted. In one such embodiments, the controller 70 is configured to perform open-loop control of the temperature of the surface. By way of example, the controller 70 may turn the heating element 100 on to a predetermined output level each time the heat strip module 50 is turned on. By way of another example, a user may indicate a target output level (e.g., 80% capacity, 50% capacity, etc.) through the user interface 80, and the controller 70 may control the heating element 100 to reach that target output level.

In some embodiments, the controller 70 is configured to control all of the heat strip modules 50 to have the same settings. By way of example, the controller 70 controls all of the heating elements 100 to have the same output levels. In other embodiments, the controller 70 is configured to individually address and control each of the heat strip modules 50. By way of example, the controller 70 may control the heating element 100 of one heat strip module 50 to have a 50% capacity output level while controlling another heating element 100 of another heat strip module 50 to have a 90% capacity output level. In some embodiments, the controller 70 has dedicated lines of communication to each of the heat strip modules 50. In other embodiments, the controller 70 sends the same command to each of the heat strip modules 50 simultaneously, but includes an identifier along with the command. Each heat strip module 50 may be configured to respond to only commands accompanied by specific identifiers (e.g., each heat strip module 50 may have an associated, unique identifier).

Referring again to FIG. 2, the control system 12 may include one or more light sources 130. The light sources 130 are configured to emit visible light toward the food product receptacles 30 to facilitate viewing of the food products by a user. The light sources 130 may include any type of device that can emit visible light (e.g., light emitting diodes (LEDs), incandescent bulbs, fluorescent bulbs, etc.). In some embodiments, the light sources 130 are built into the heat strip modules 50 such that the light sources 130 move with the heat strip modules 50. In some embodiments, the light sources 130 are coupled to and extend along the length of the track 52. In both such types of embodiments, the light may be emitted downward toward the food products. In other embodiments, the light sources 130 are otherwise located.

Referring to FIGS. 3-6, the food serving station 10 is shown as food serving station 200, according to an exemplary embodiment. In this embodiment, the track 52 is supported by a pair of upright members or vertical members, shown as uprights 54, each positioned at opposite end portions of the track 52. The heat strip modules 50 are positioned along the length of the track 52 and hang below the track 52. The heat strip modules 50 are pivotally coupled to the track 52 such that the heat strip modules 50 are each configured to rotate about a vertical axis V extending through the center of the coupler 60. Specifically, the heat strip modules 50 are rotatable between a first orientation, shown in FIG. 3, in which the heat strip modules 50 extend substantially parallel to the length of the track 52, and a second orientation, shown in FIG. 4, in which the heat strip modules 50 extend substantially perpendicular to the length of the track 52.

Referring to FIGS. 5 and 6, each heat strip module 50 includes a casing, shown as housing 210, including a first member, shown as outer wall 212, and a second member, shown as inner wall 214. The outer wall 212 and the inner wall 214 are both concave, and the inner wall 214 is received within the outer wall 212. A volume 216 is formed between the outer wall 212 and the inner wall 214. In some embodiments, the volume 216 is substantially sealed (e.g., by welding the outer wall 212 to the inner wall 214). The volume 216 may be filled with a fluid insulation (e.g., air, etc.) or a solid insulation (e.g., foam, etc.) to reduce heat transfer from the heating element 100 through the volume 216. The inner wall 214 receives the reflector 110, which in turn receives the heating element 100. A volume 218 is formed between the inner wall 214 and the reflector 110. The volume 218 may be filled with a fluid insulation (e.g., air, etc.) or a solid insulation (e.g., foam, etc.) to reduce heat transfer from the heating element 100 through the volume 218.

The coupler 60 includes a vertical member, shown as post 220, that extends upward from the housing 210 and into the track 52. The post 220 may define one or more passages, through which an electrical connection (e.g., wires) can pass to connect the heating element 100 to the controller 70. Coupled to an end portion of the post 220 distal from the housing 210 is a radial protrusion, shown as shoulder 222, that is configured to engage the track 52 to limit downward movement of the heat strip module 50. The shoulder 222 may be sized to permit rotation of the heat strip module 50 between the first orientation and the second orientation without disconnecting the heat strip module 50 from the track 52. In some embodiments, the shoulder 222 is sized such that rotation to a third orientation outside the first and second orientations permits the heat strip module 50 to drop downward and disconnect from the track 52. A spacer, shown as collar 224, surrounds the post 220 between the housing 210 and the track 52. The collar 224 is configured to engage both the housing 210 and the track 52 to limit upward movement of the heat strip module 50.

The heating element 100, the reflector 110, the inner wall 214, and the outer wall 212 are all elongated (e.g., have a length longer than their widths) and extend substantially perpendicular to the vertical axis V. The reflector 110 is concave about both a longitudinal axis (e.g., as shown in FIG. 5) and a lateral axis (e.g., as shown in FIG. 6), which extend perpendicular to one another and to the vertical axis V. The concave shape of the reflector 110 opens downward to direct energy from the heating element 100 downward toward the food product receptacles 30 (e.g., as shown in dashed lines in FIGS. 5 and 6).

The track 52 defines a pair of recesses or grooves, shown as lighting slots 230, configured to each receive one or more light sources 130. The light sources 130 may be fixed relative to the track 52. The lighting slots 230 extend along a length of the track 52 and are positioned on opposite sides of the heat strip module 50. The lighting slots 230 are angled outward (e.g., 15 degrees, 30 degrees, 45 degrees, etc.) relative to the vertical axis V to increase the width of an area illuminated by the light sources 130. This placement of the light sources 130 separates the light sources 130 from the heating element 100 (e.g., by placing the light sources 130 and the heating elements 100 in different housings or containers). This reduces heat transfer from the heating elements 100 to the light sources 130 relative to an embodiment where the light sources 130 are placed in the same housing as the heating elements 100. This reduces the need for insulation within the housing 210 of the heat strip module 50, permitting the use of less expensive insulators (e.g., air, a less efficient solid insulator, etc.). This reduction in heat transfer reduces the operating temperature of the light sources 130, increasing the lifespan of the light sources 130. An increased operating temperature could also vary the properties of the light emitted by the light sources 130 (e.g., the color of the light) in an unintended and/or undesirable way.

The heat strip modules 50 are both selectively rotatable about the vertical axes V and selectively repositionable along the length of the track 52. This permits the user to reconfigure the food serving station 200 based on the types and arrangement of food products to be served. Due to the elongated shape of the heating element 100 and the reflector 110, the area heated by the heat strip module 50 is also elongated and has a similar orientation to the heat strip module 50. When the heat strip modules 50 are oriented parallel to the track 52, the energy from the heat strip modules 50 is spread out more longitudinally and is generally less concentrated on a given longitudinal area (e.g., on each food product receptacle 30). When the heat strip modules 50 are oriented perpendicular to the track 52, the energy from the heat strip modules 50 is spread over a smaller longitudinal distance and is generally more highly concentrated on the given longitudinal area. Repositioning the heat strip modules 50 along the length of the track 52 permits the energy to be supplied to a desired area. The heat strip modules 50 may also be repositioned to avoid engagement with one or more obstacles (e.g., the breath guard 360). Conventional food warmers are fixed in place and do not provide this level of configurability.

Figure 7:
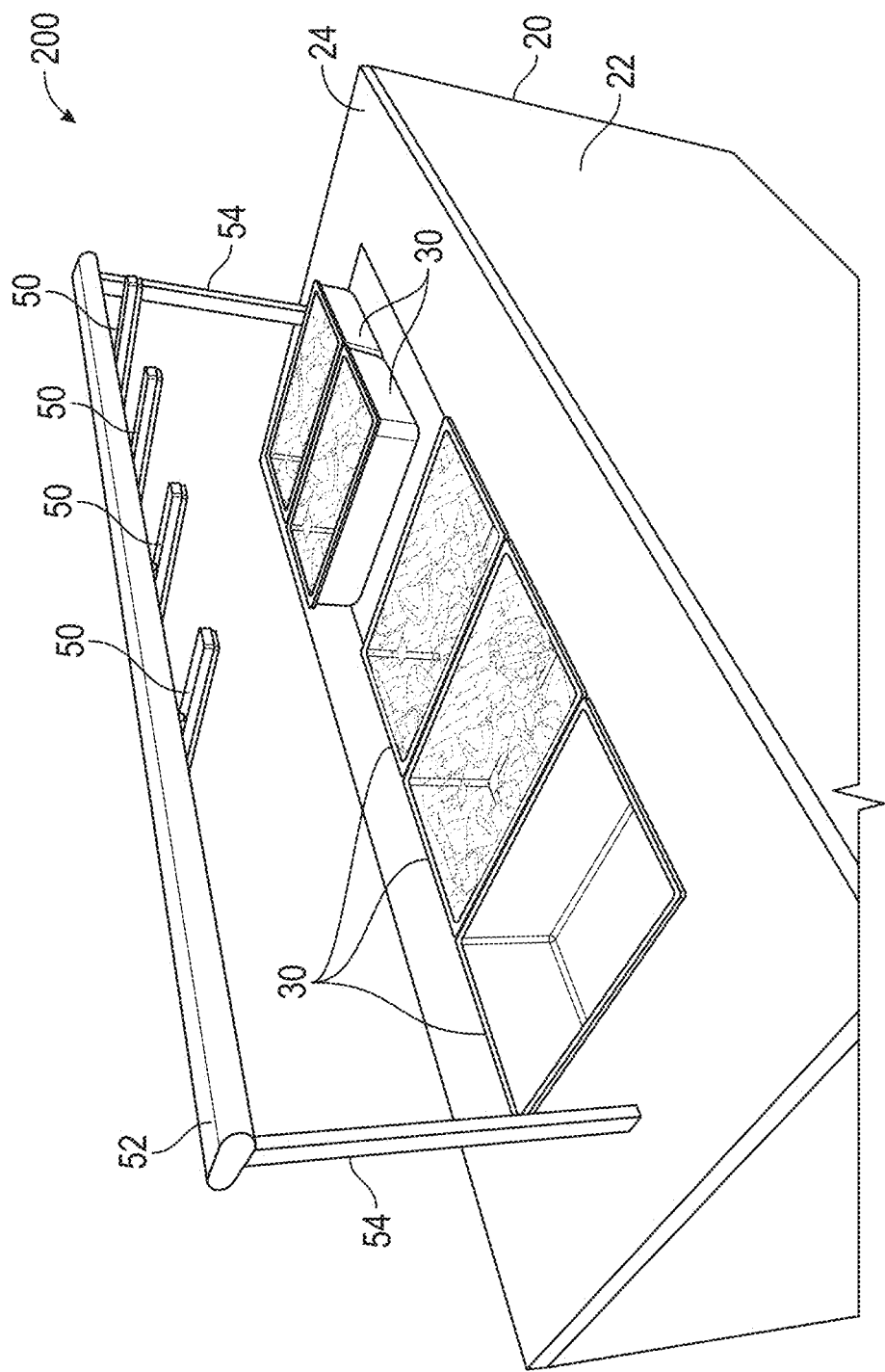
FIGS. 7-10 are perspective views of the food serving station of FIG. 3 in various configurations.

FIGS. 7-10 illustrate four exemplary configurations of the food serving stations 200. The food serving station 200 may be selectively reconfigured between any of these configurations depending upon the desired usage scenario. In the configuration of FIG. 7, four heat strip modules 50 are arranged perpendicular to the track 52. Two of the food product receptacles 30 are pans that extend below the counter 24, and two are pans positioned atop the counter 24 (e.g., atop a warming surface). The rightmost two pans are narrower than the other two pans (e.g., 12 inch pans versus 20 inch pans), and the heat strip modules 50 are approximately centered above each pan. The leftmost food product receptacle 30 is a pan that extends below the counter 24, however, this pan is not heated directly by a heat strip module 50. This may be because the food products are sufficiently heated by the temperature control device 40, or this may be because the food products are kept at less than room temperature. Because the heat strip modules 50 concentrate the delivered thermal energy over a configurable area, the heat strip modules 50 facilitate displaying cold food products in close proximity to hot food products.

Figure 8:
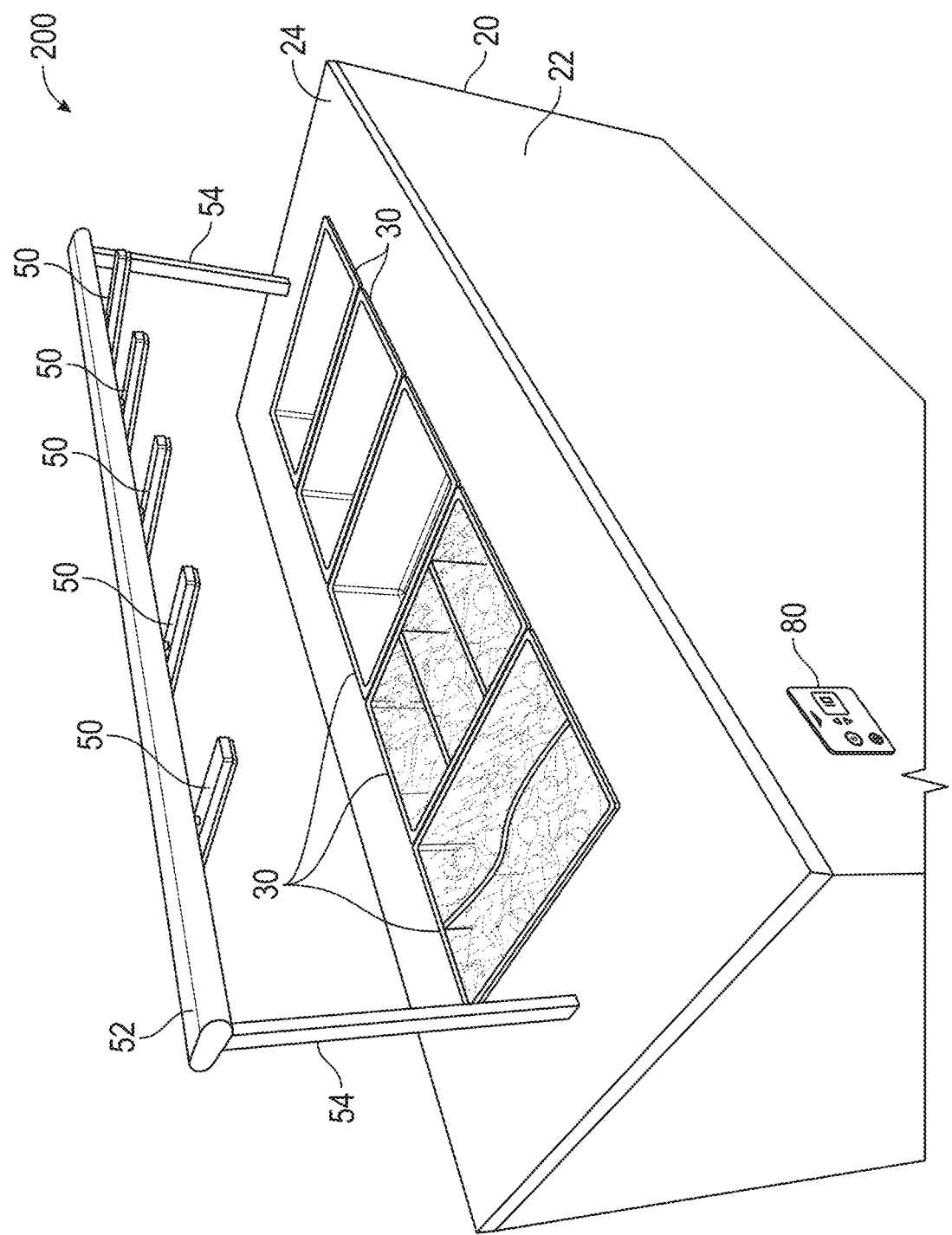

In the configuration of FIG. 8, five heat strip modules 50 are arranged perpendicular to the track 52. The food product receptacles 30 include five pans that extend below the counter 24, each of which is approximately centered on one of the heat strip modules 50. Two of the pans include dividers that facilitate holding multiple types of food product within a single pan.

Figure 9:
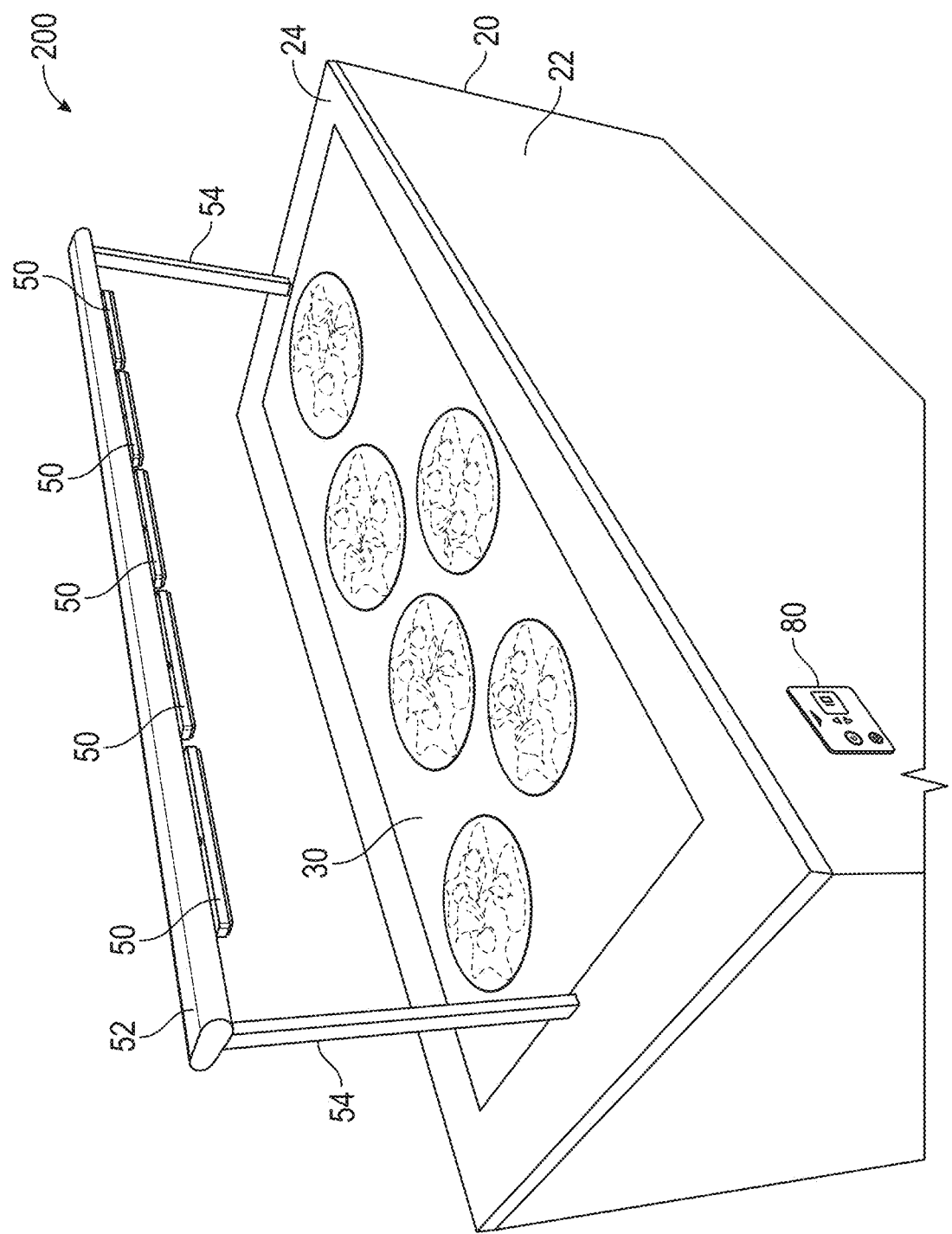

In the configuration of FIG. 9, five heat strip modules 50 are arranged parallel to the track 52. One large food product receptacle 30 has a flat surface arranged substantially level with the counter 24. This flat surface may be a warming surface coupled to a temperature control device 40. The flat surface is shown as supporting multiple pizzas. The heat strip modules 50 are arranged adjacent to one another such that the heat strip modules 50 provide energy along approximately the entire length of the flat surface. Because the heat strip modules 50 are oriented parallel to the track 52, the energy from the heat strip modules 50 may be relatively less concentrated on each longitudinal section of the flat surface than if the heat strip modules 50 were oriented perpendicular to the track 52.

Figure 10:
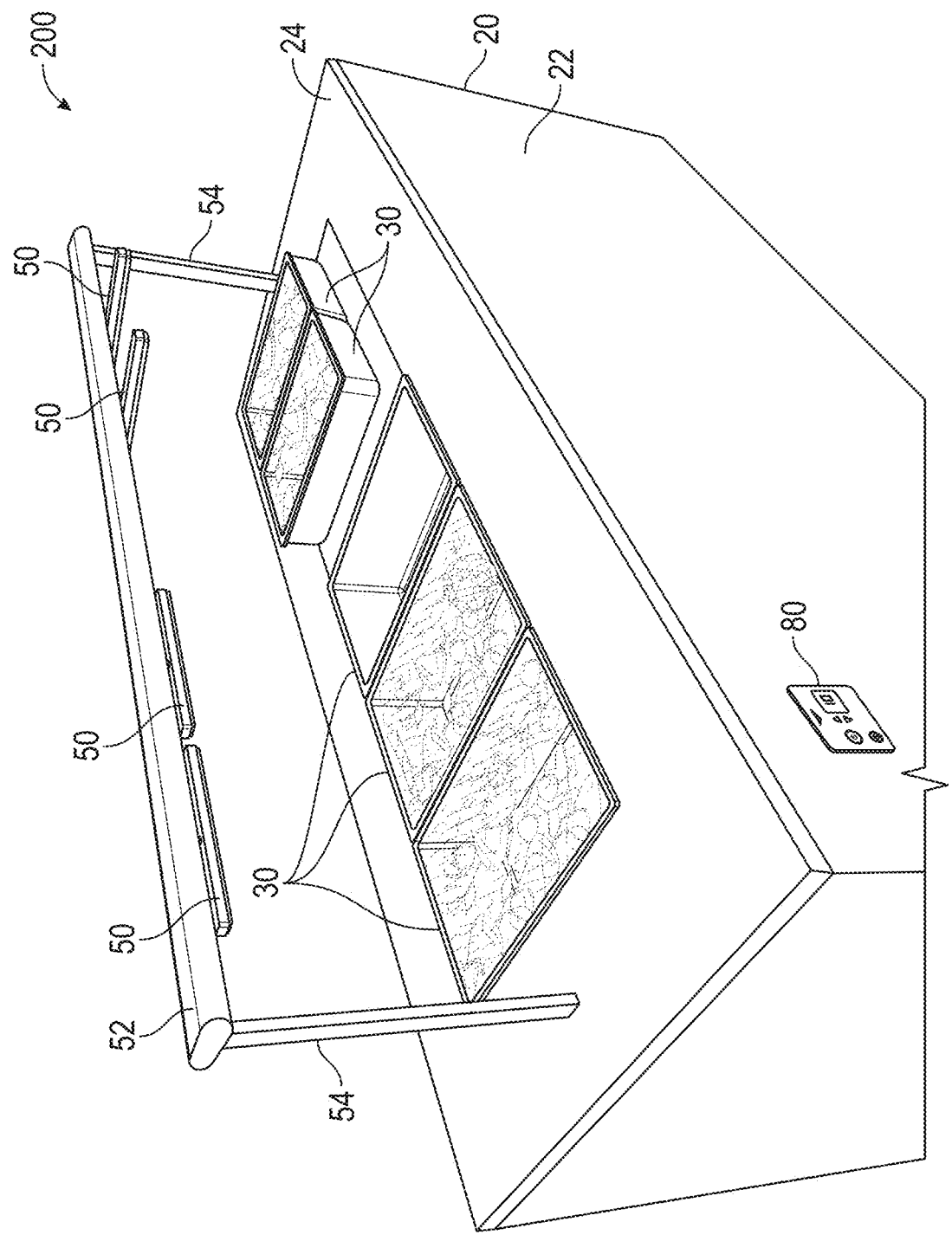

In the configuration of FIG. 10, two heat strip modules 50 are arranged parallel to the track 52, and two heat strip modules 50 are arranged perpendicular to the track 52. Three of the food product receptacles 30 are pans that extend below the counter 24, and two are pans positioned atop the counter 24 (e.g., atop a warming surface). The rightmost two pans are narrower than the other two pans, and the heat strip modules 50 that are oriented perpendicular to the track 52 are approximately centered above each pan. The heat strip modules 50 that are oriented parallel to the track 52 are evenly distributed along the other three pans. Accordingly, the two smaller pans receive a relatively greater concentration of energy than the three larger pans.

Figure 11:
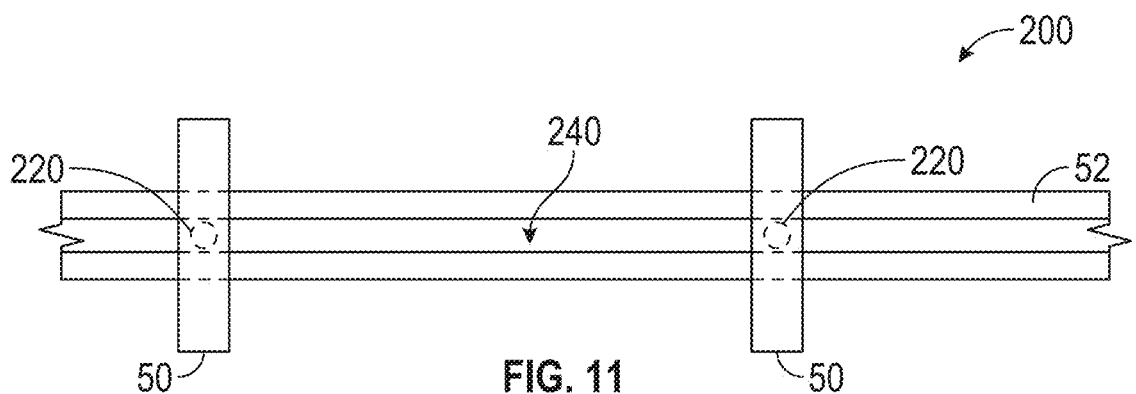
FIG. 11 is a bottom view of a track and heat strip modules of a food serving station, according to an exemplary embodiment.
Figure 12:
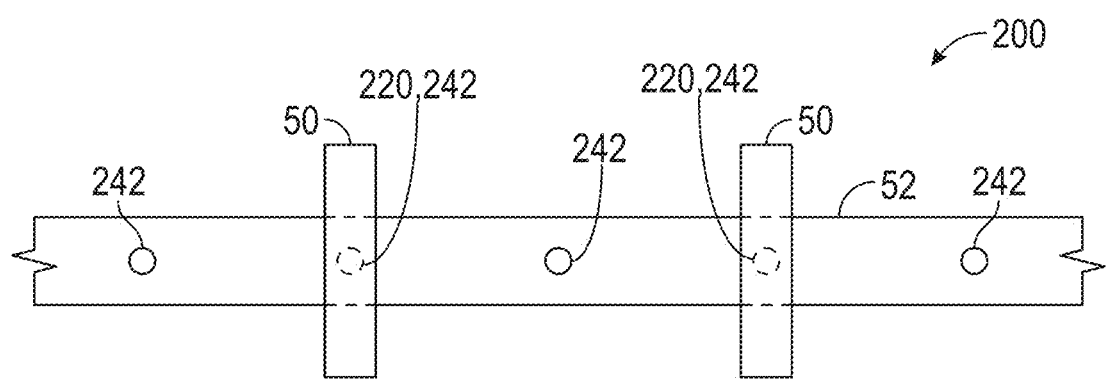
FIG. 12 is a bottom view of a track and heat strip modules of a food serving station, according to another exemplary embodiment.

The heat strip modules 50 may be continuously repositionable along the length of the track 52, or the heat strip modules 50 may be repositionable between a finite number of discrete positions. Referring to FIG. 11, the track 52 defines a slot or groove, shown as track groove 240, according to an exemplary embodiment. The track groove 240 engages the coupler 60 (e.g., receives the post 220) such that the heat strip module 50 is continuously repositionable (i.e., repositionable into an infinite number of different positions) along the length of the track 52. The heat strip module 50 may be repositioned by removing the heat strip module 50 and replacing it in a different position or by sliding the heat strip module 50 along the length of the track 52. The heat strip modules 50 may be inserted into and/or removed from the track 52 vertically or longitudinally (e.g., through an end of the track 52). Referring to FIG. 12, the track 52 defines a series of protrusions or recesses, shown as connection points 242, according to an alternative embodiment. The connection points 242 are spaced along a length of the track 52. The spacing between each subsequent connection point 242 may be regular (e.g., substantially equal) or irregular. The connection points 242 are each configured to engage the coupler 60 (e.g., by receiving the post 220), such that the heat strip module 50 can be repositioned between a finite number of discrete positions, each corresponding to one of the connection points 242. The heat strip module 50 may be repositioned by removing the heat strip module 50 and replacing it in a different position corresponding to a different connection point 242.

Figure 13:
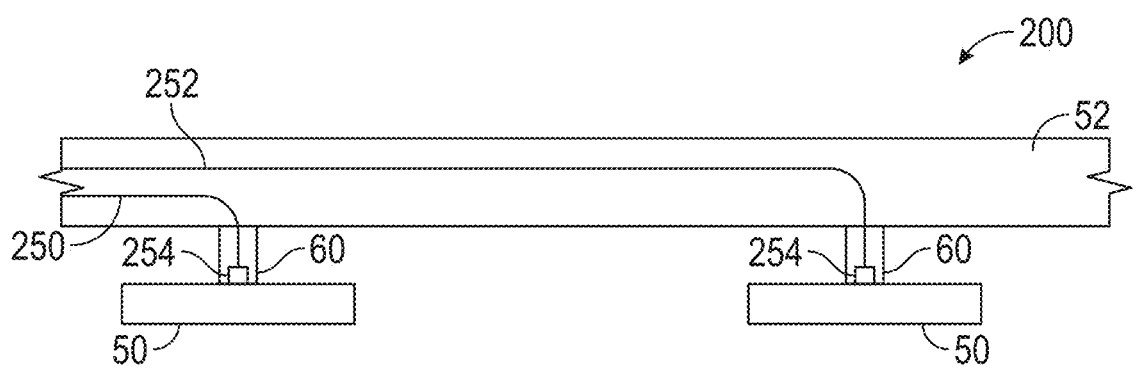
FIG. 13 is a side section view of an electrical connection of a food serving station, according to an exemplary embodiment.

FIGS. 11-13 illustrate various embodiments of the track 52, each of which may be utilized in any food serving stations shown and/or described herein (e.g., the food serving station 10, the food serving station 350, etc.). The heat strip modules 50 may be selectively electrically coupled to the controller 70 to permit selective removal and replacement of the heat strip modules 50. This electrical connection may configured to transfer electrical energy and/or data (e.g., commands). Referring to FIG. 13, the electrical connection is shown according to an exemplary embodiment. In this embodiment a first electrical connection or wire bundle (e.g., the wire 58, etc.), shown as wire bundle 250, is coupled to the controller 70 and extends through the track 52 and the coupler 60 to one heat strip module 50. A second electrical connection or wire bundle, shown as wire bundle 252, is coupled to the controller 70 and extends through the track 52 and the coupler 60 to another heat strip module 50. Each heat strip module 50 includes an electrical connector (e.g., a pair of terminals, a DIN connector, etc.) that permits selective coupling of the wire bundle 250 or the wire bundle 252 to the heat strip module 50. By way of example, one heat strip module 50 may be disconnected from the wire bundle 250, repositioned, and connected to the wire bundle 252. The food serving station 10 may include a wire bundle for each of the heat strip modules 50 and/or a wire bundle for each connection point 242.

Referring to FIGS. 14-16, an electrical connection may include a power track assembly 270 that electrically couples the heat strip module 50 to the controller 70. The power track assembly 270 may permit longitudinal movement of the heat strip module 50 without disconnecting. Accordingly, the power track assembly 270 may be used in the embodiment of FIG. 11. The power track assembly 270 includes an elongated housing, shown as track connector housing 272. The track connector housing 272 may be coupled to (e.g., integrally formed with, etc.) the track 52 and may define the track groove 240. The track connector housing 272 is coupled to a pair of insulators, shown as isolators 274, that extend along the length of the track connector housing 272. The isolators 274 each define a pair of vertically-offset grooves that extend along a length of the track connector housing 272. Each groove receives either a first longitudinal contact 276 or a second longitudinal contact 278. The isolators 274 are made from an electrically insulative material such that the first longitudinal contacts 276 are electrically isolated (i.e., electrically decoupled) from the second longitudinal contacts 278. A first contact, shown as first annular contact 280, and a second contact, shown as second annular contact 282, are coupled to the post 220 and electrically coupled to the heat strip module 50.

When the post 220 is received within the track groove 240, the first annular contact 280 engages at least one of first longitudinal contacts 276, and the second annular contact 282 engages at least one of the second longitudinal contacts 278, electrically coupling the heat strip module 50 to the controller 70. Due to the longitudinal arrangement of the longitudinal contacts, the connection stays constant (e.g., is not interrupted) as the heat strip module 50 moves along the length of the track 52. Due to the annular arrangement of the annular contacts, the connection says constant as the heat strip module 50 is rotated. In some embodiments, the shoulder 222 is received within and engages a wall of a longitudinal groove, shown as shoulder support groove 284, defined by the track connector housing 272 to support the heat strip module 50.

Figure 17:
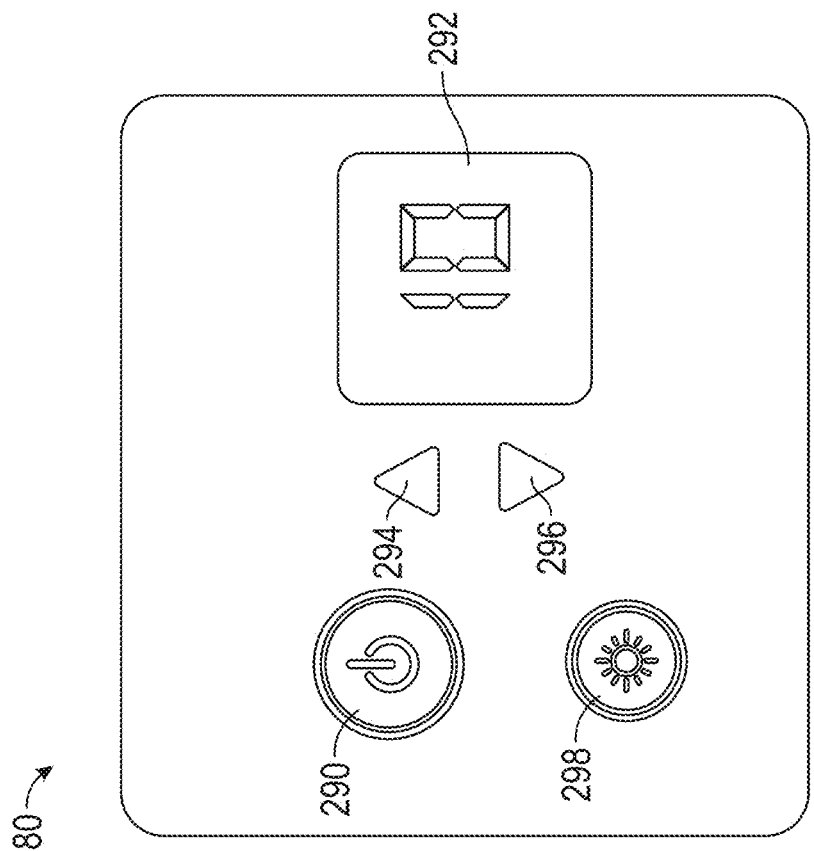

As shown in FIGS. 3 and 4, the food serving station 200 includes a user interface 80 configured to control the operation of the temperature control devices 40, the heat strip modules 50, and/or the light sources 130. One user interface 80 may be configured to control multiple devices. Alternatively, multiple user interfaces 80 may be included, each dedicated to the control of one or more of the devices. Referring to FIG. 17, the user interface 80 is shown according to an exemplary embodiment. In some embodiments, this user interface 80 is coupled to the base 20. The user interface 80 includes a first input device, shown as power button 290. When pressed, the power button 290 sends a command to the controller 70 to activate or deactivate one or more of the heat strip modules 50, depending upon if the heat strip modules 50 are currently activated or deactivated. The user interface 80 includes an output device, shown as display 292. The display 292 is configured to indicate information, such as the output level setting of one or more of the heat strip modules 50 (e.g., on a percentage scale, on a 1-10 scale, etc.). The user interface 80 includes a pair of second input devices, shown as output level up button 294 and output level down button 296. The output level up button 294 is configured to command the controller 70 to increase the output level setting when pressed, and the output level down button 296 is configured to decrease the output level setting when pressed. The user interface 80 includes a third input device, shown as light on/off button 298. When pressed, the light on/off button 298 sends a command to the controller 70 to activate or deactivate the light sources 130, depending upon if the light sources 130 are currently activated or deactivated.

Figure 18:
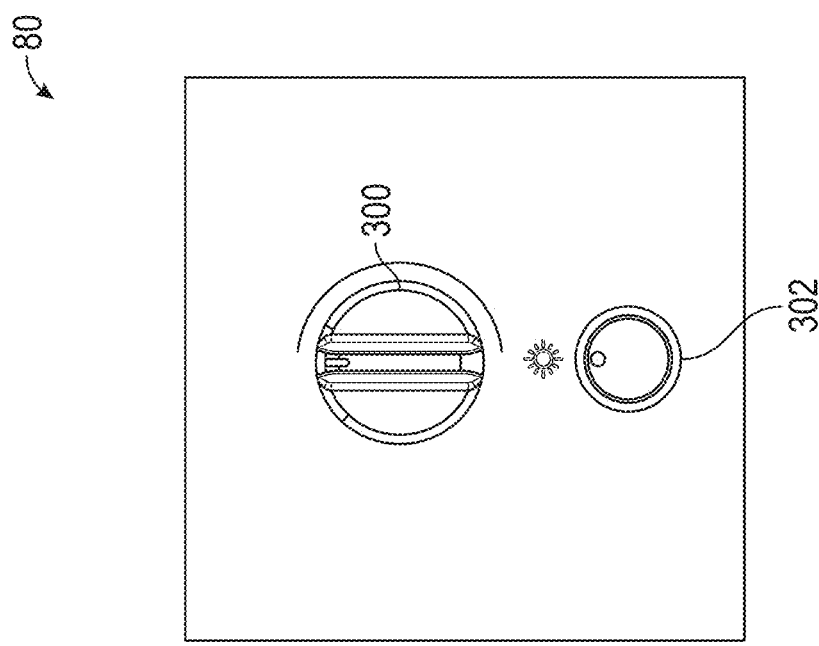
FIGS. 17 and 18 are front views of user interfaces of a food serving station, according to various exemplary embodiments.

Referring to FIG. 18, the user interface 80 is shown according to an alternative embodiment. In some embodiments, this user interface 80 is coupled to the base 20. The user interface 80 includes a first input device, shown as output level knob 300. The output level knob 300 is rotatable between an off position and a full power position. The output level knob 300 is configured to send a command to the controller 70 to control the output level of one or more of the heat strip modules 50 based on the position of the output level knob 300. In the off position, the at least one heat strip module 50 is deactivated. In the full power position, the at least one heat strip module 50 is at the maximum output level. The controller 70 may control the output level of the at least one heat strip module 50 proportionally based upon the position of the output level knob 300 between the off position and the full power position. The user interface 80 includes a second input device, shown as light on/off switch 302. When in an on position, the light on/off switch 302 sends a command to the controller 70 to activate the light sources 130. When in an off position, the light on/off switch 302 sends a command to the controller 70 to deactivate the light sources 130.

Figure 19:
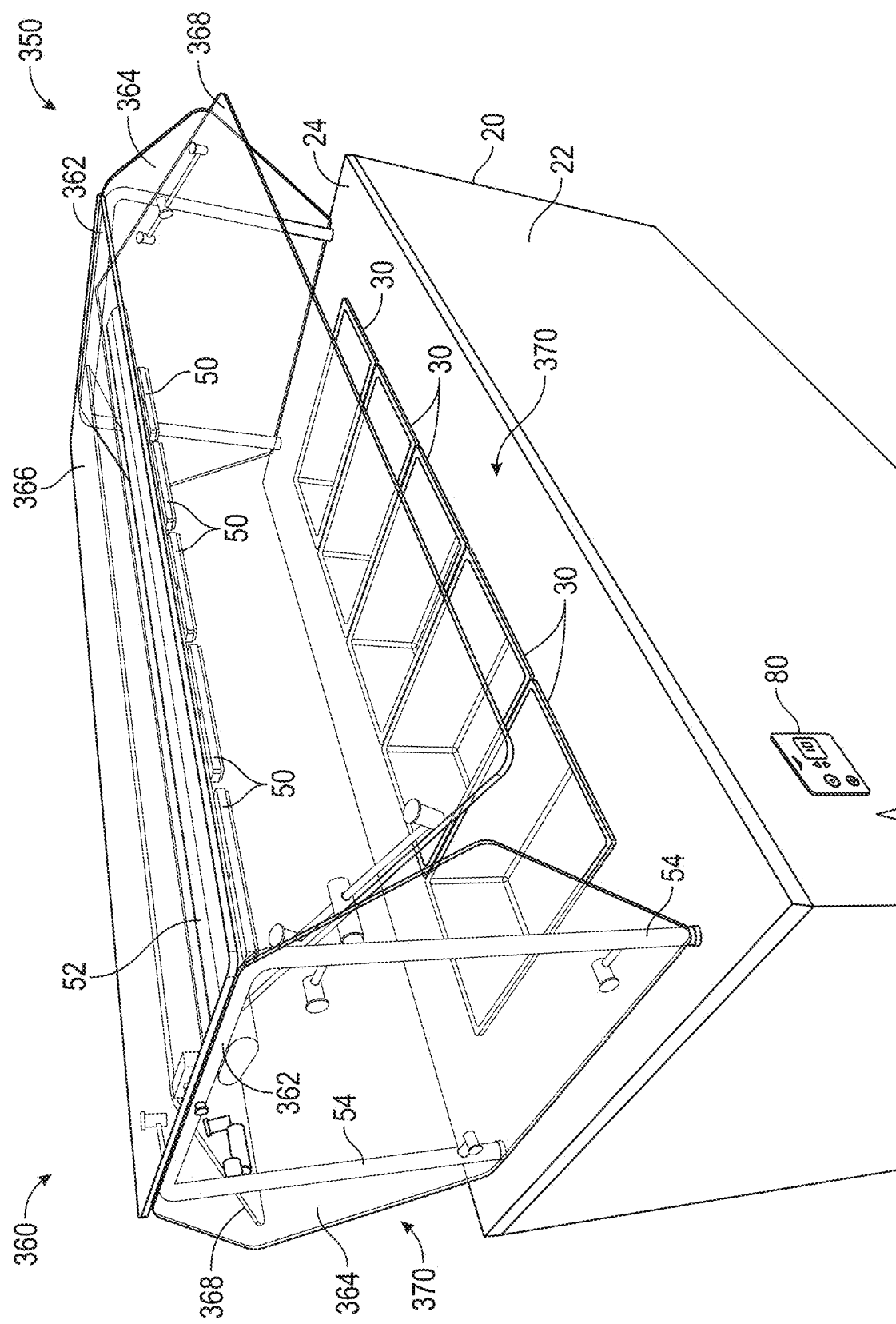
FIG. 19 is a perspective view of a food serving station including a breath guard, according to an exemplary embodiment.
Figure 20:
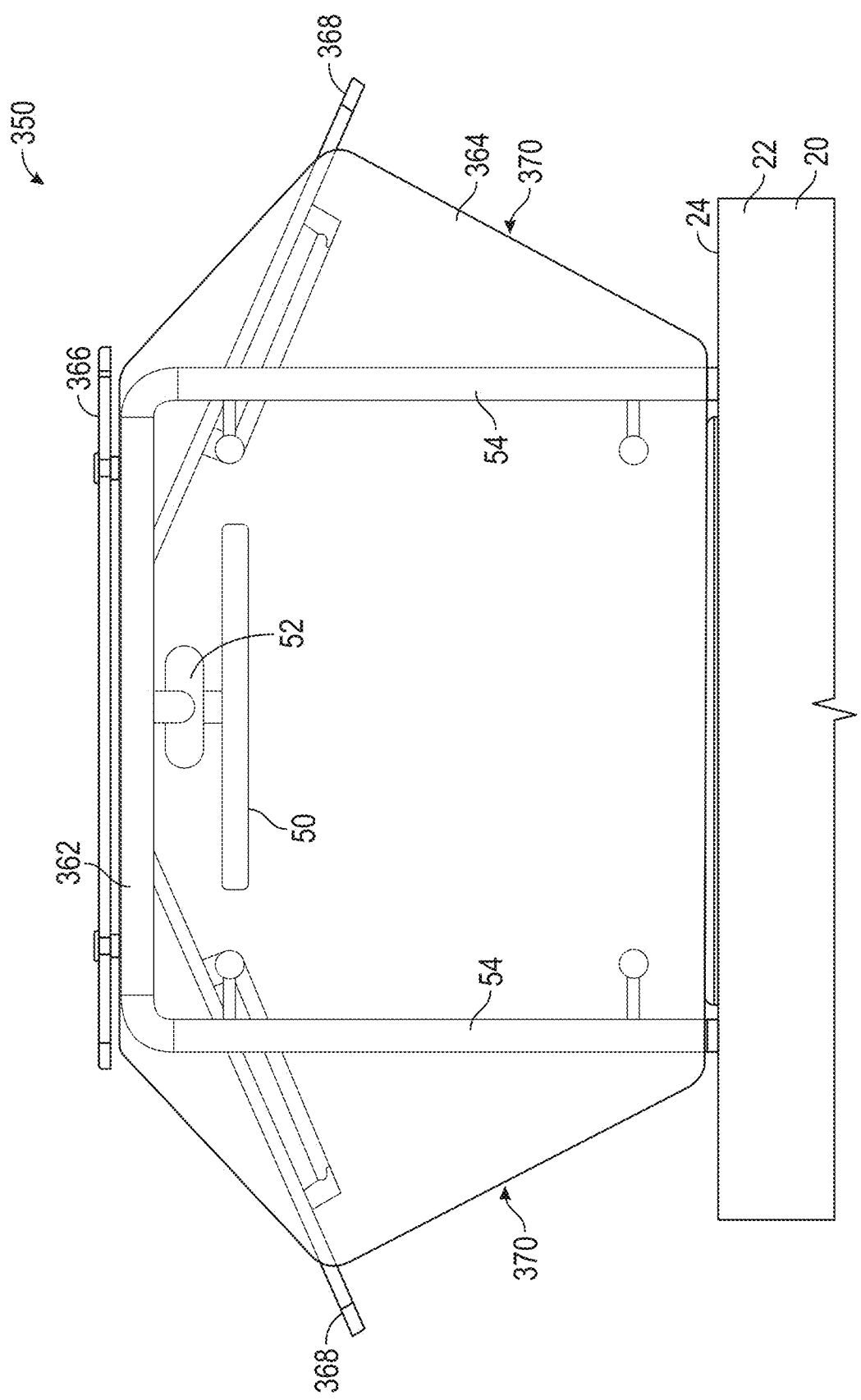
FIG. 20 is a side view of the food serving station of FIG. 19.

Referring to FIGS. 19 and 20, a food serving station 350 is shown as an alternative embodiment to the food serving station 200. The food serving station 350 may be substantially similar to the food serving station 200 except as otherwise specified herein. The food serving station 350 includes a sneeze guard or breath guard assembly, shown as breath guard 360. The breath guard 360 is configured to block contaminants (e.g., from one or more users, etc.) from reaching the food product receptacles 30. The breath guard 360 includes two of the uprights 54 on each end, each pair of uprights 54 being coupled by a lateral member, shown as horizontal member 362. The uprights 54 and the horizontal member 362 on each size may be integrally formed. The track 52 is coupled to the horizontal members 362. Electrical connections (e.g., the wires 58, the wire bundle 250, the wire bundle 252, etc.) may extend from the heat strip modules 50, through the track 52, a horizontal member 362, and an upright 54 and into the housing 22, protecting the connections and obscuring them from view of an observer.

A pair of vertical panels, shown as end panels 364, are coupled to the uprights 54 on each end of the breath guard 360. A horizontal panel, shown as top panel 366, is coupled to the horizontal members 362. The top panel 366 extends substantially parallel to the counter 24 and above the track 52. The top panel 366 and the end panels 364 may be substantially fixed relative to the base 20. A pair of longitudinal panels, shown as side panels 368, are coupled to the uprights 54 and extend longitudinally between the end panels 364. A top edge of each side panel 368 is positioned adjacent the top panel 366 to block contaminants. An aperture, shown as access opening 370, is defined between each side panel 368, the end panels 364, and the counter 24. A user may access the food product receptacles 30 (e.g., for cleaning, to add or remove food products, etc.) through the access openings 370. In some embodiments, the side panels 368 are selectively repositionable (e.g., pivotable, able to be raised and lowered, etc.) to vary the sizes of the access openings 370. The panels of the breath guard 360 may be made from polycarbonate, acrylic, glass, or another transparent or translucent material to facilitate a user viewing the food products through the breath guard 360.

Figure 21:
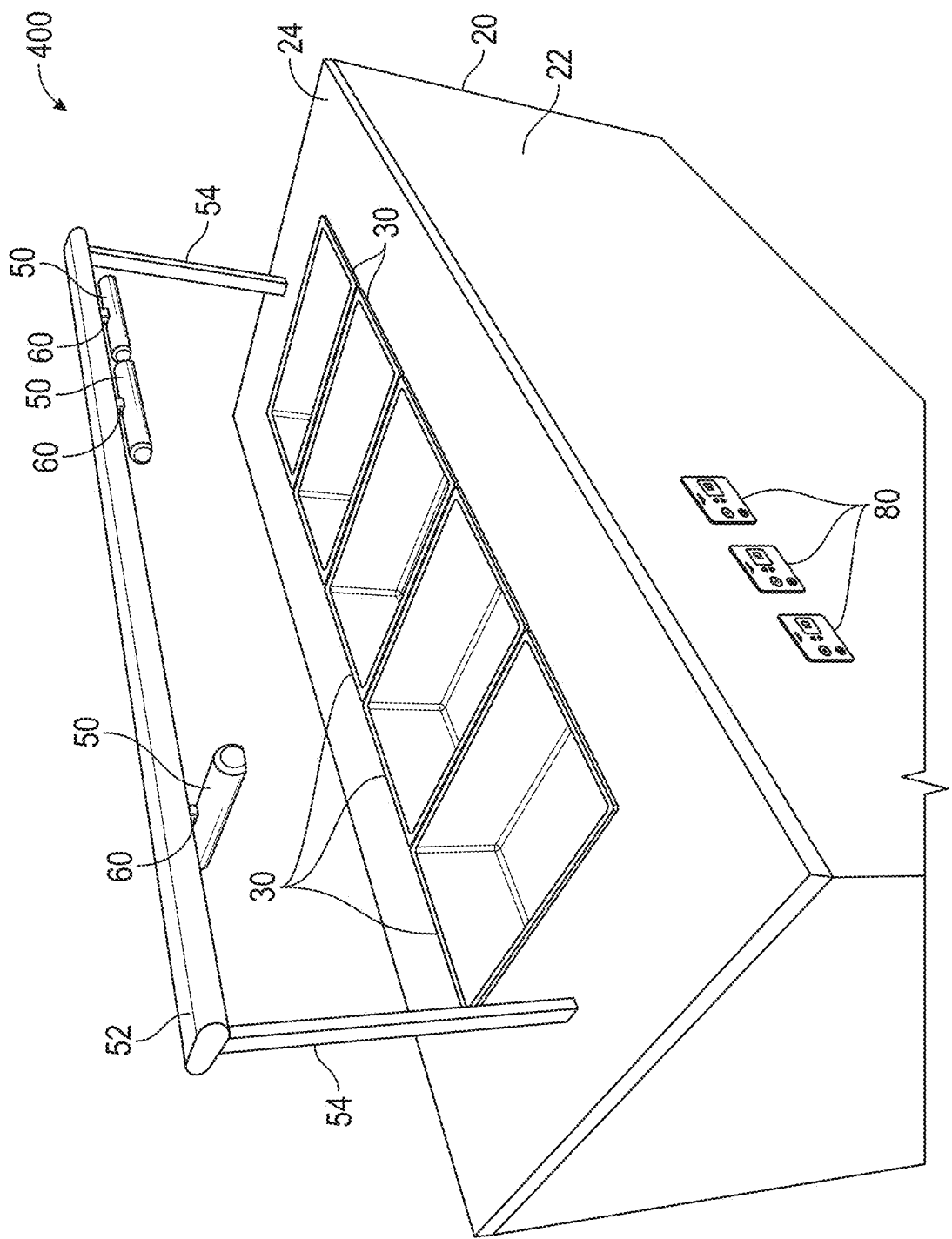
FIG. 21 is a perspective view of a food serving station, according to an exemplary embodiment.
Figure 22:
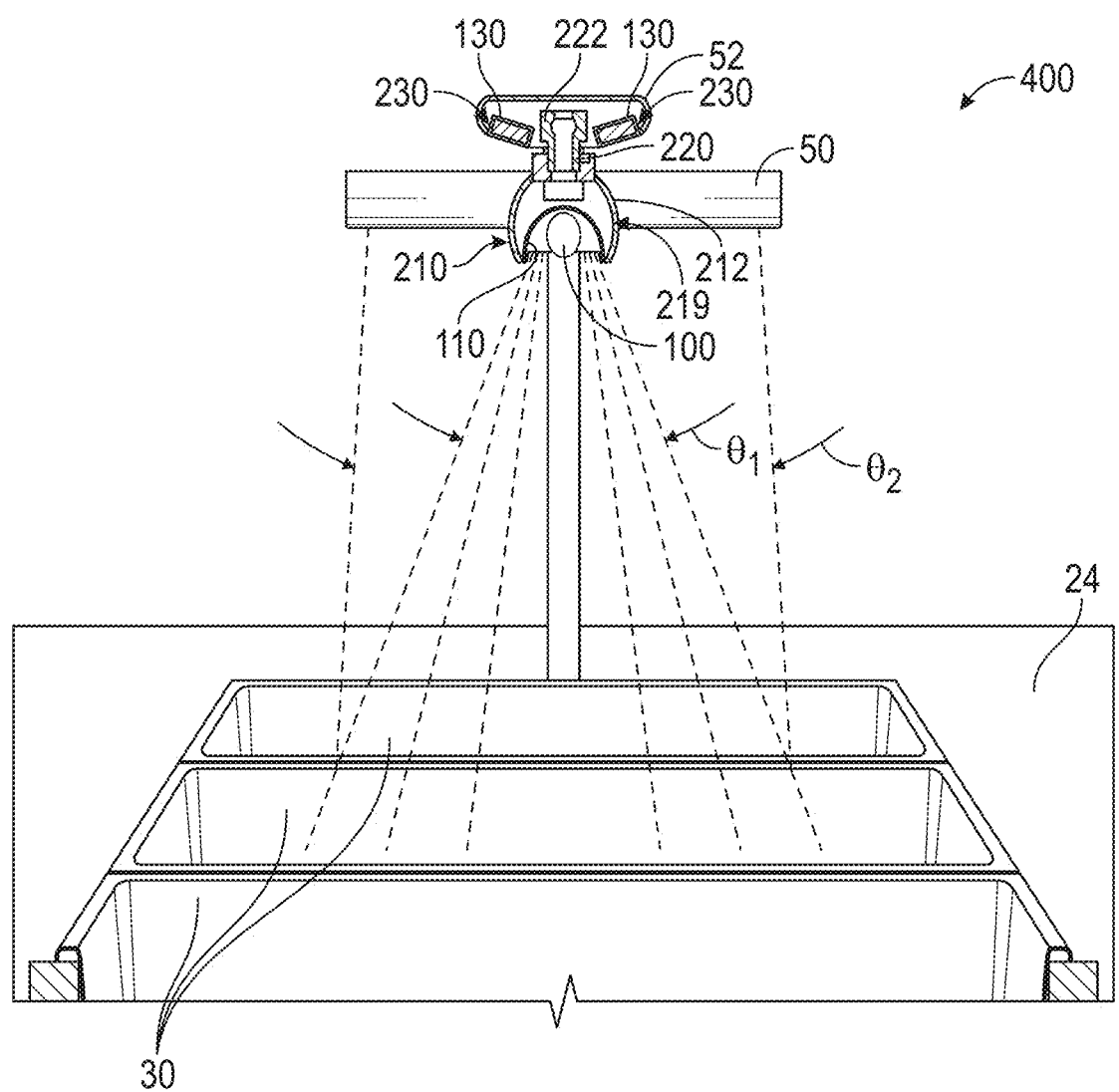
FIG. 22 is a side section view of the food serving station of FIG. 21.
Figure 23:
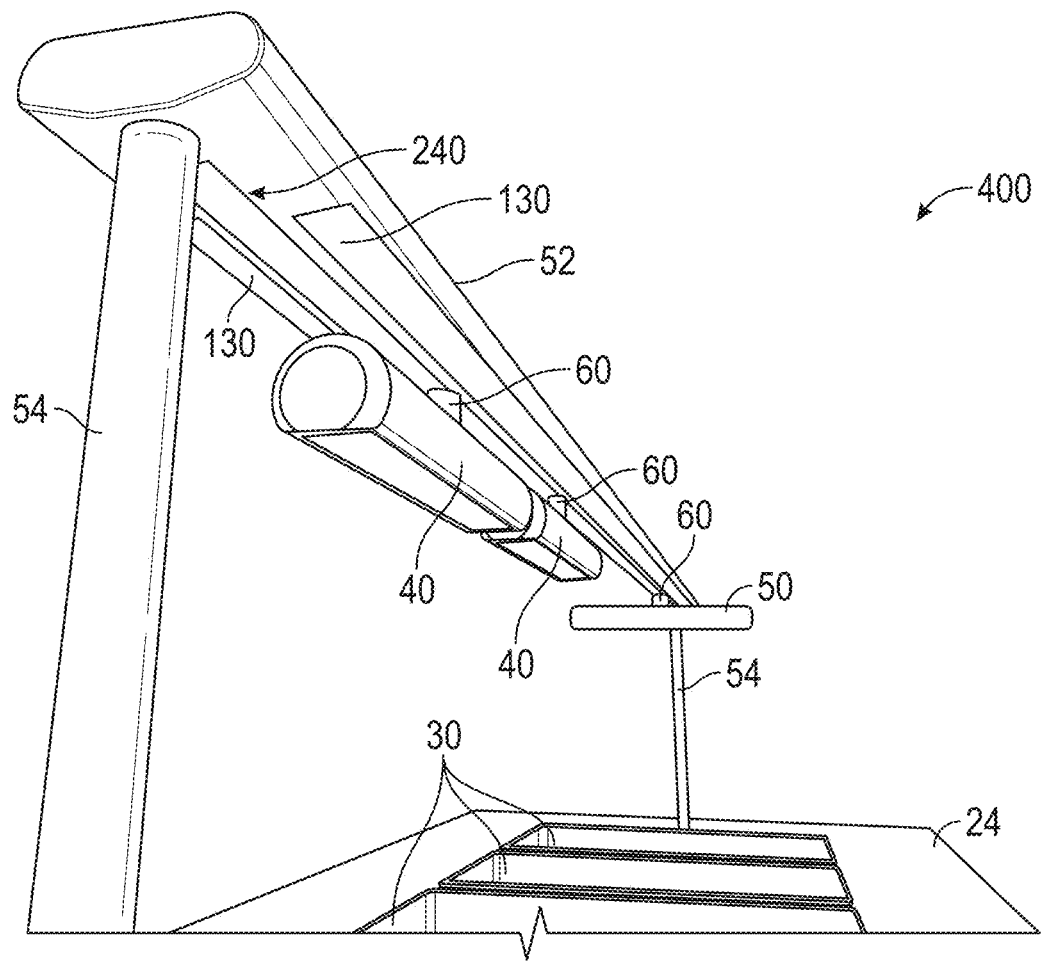
FIG. 23 is a perspective view of the food serving station of FIG. 21.

Referring to FIGS. 21-23, a food serving station 400 is shown as an alternative embodiment to the food serving station 200. The food serving station 400 may be substantially similar to the food serving station 200 except as otherwise specified herein. As shown in FIG. 21, the food serving station 400 includes three user interfaces 80 (e.g., the user interfaces shown in FIGS. 17 and 18, etc.). Each user interface 80 is dedicated to the control of one of the heat strip modules 50. Accordingly, each heat strip module 50 can be individually controlled.

FIG. 22 illustrates the areas heated by the heat strip modules 50. The frontmost heat strip module 50 is shown in an orientation parallel to the track 52. An angle $\Theta_1$ at which energy leaves the heat strip module 50 in this orientation is relatively wide (e.g., 30 degrees, 45 degrees, 15 degrees, etc.). The rearmost heat strip module 50 is shown in an orientation perpendicular to the track 52. An angle $\Theta_2$ at which energy leaves the heat strip module 50 in this orientation is relatively narrow (e.g., 2 degrees, 5 degrees, 10 degrees, etc.). Although this is angular relationship is shown with respect to the heat strip modules 50 of FIG. 22, any of the heat strip modules 50 shown and/or described herein may have a similar angular relationship.

Referring again to FIG. 22, the housing 210 of this embodiment omits the inner wall 214 such that a single, continuous volume 219 is formed between the outer wall 212 and the reflector 110. In some embodiments, the volume 219 is substantially sealed (e.g., by welding the outer wall 212 to the reflector 110. The volume 219 may be filled with a fluid insulation (e.g., air, etc.) or a solid insulation (e.g., foam, etc.) to reduce heat transfer from the heating element 100 through the volume 216.

Figure 24:
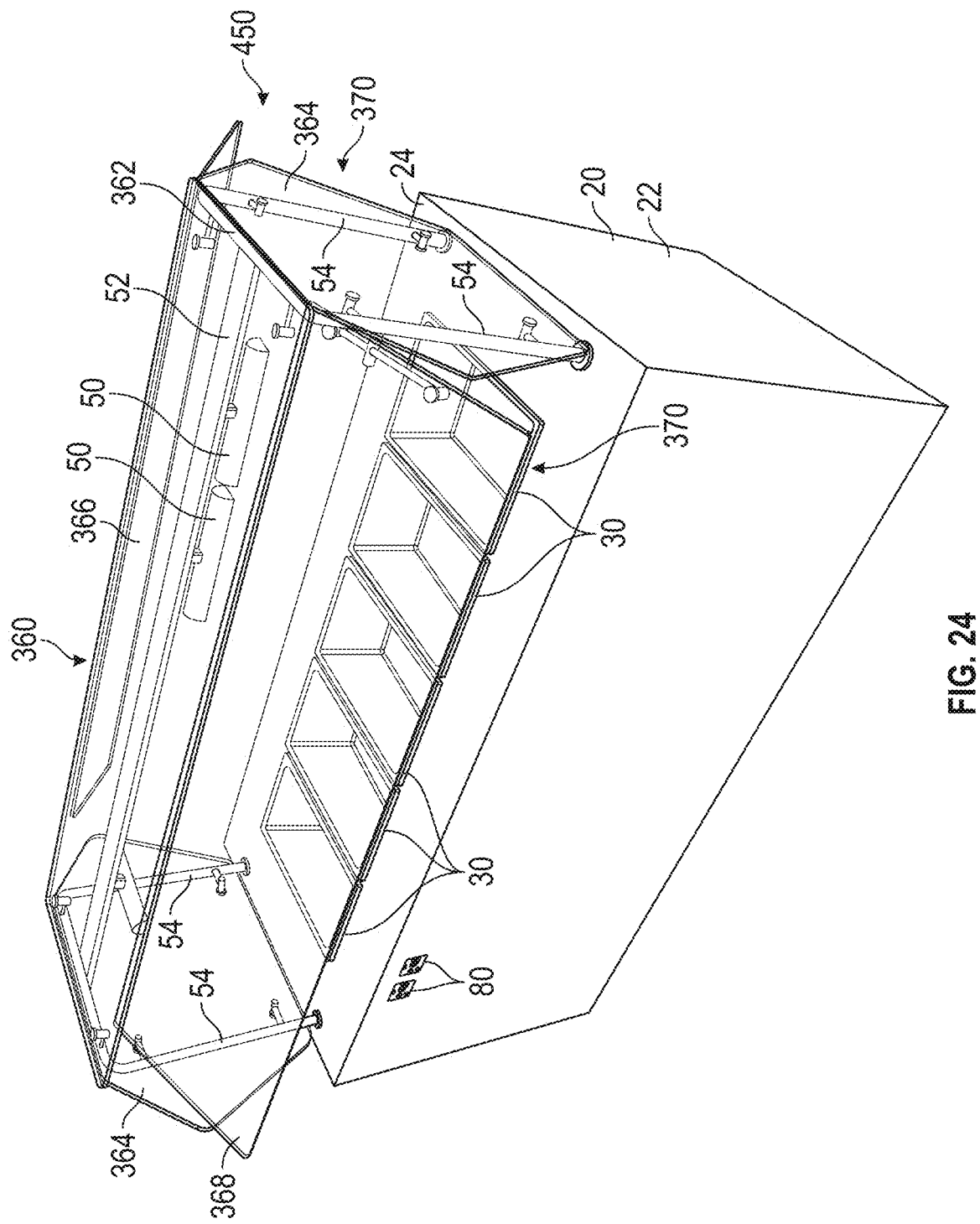
FIGS. 24 and 25 are perspective views of a food serving station including a breath guard, according to an exemplary embodiment.
Figure 25:
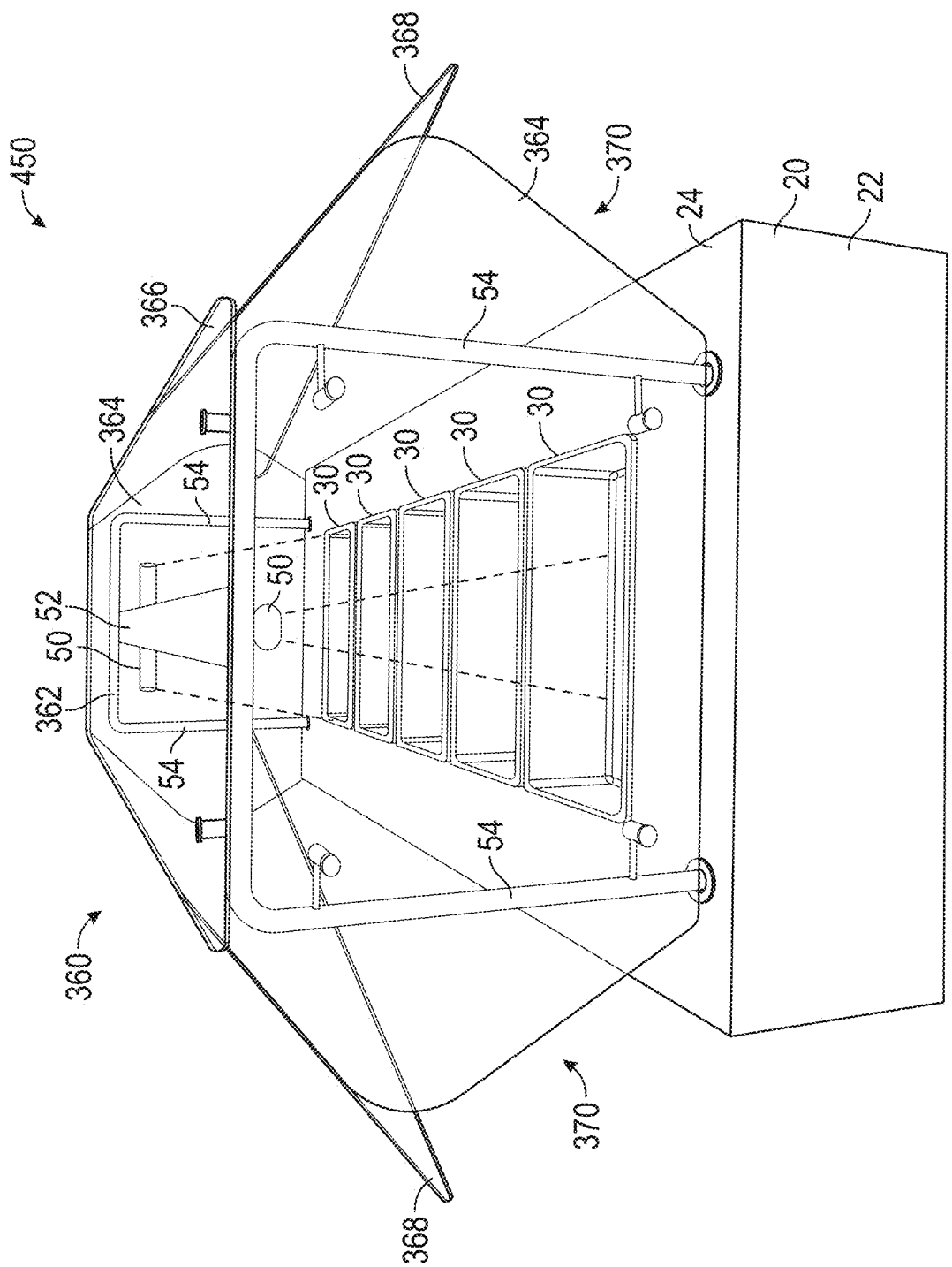

Referring to FIGS. 24 and 25, a food serving station 450 is shown as an alternative embodiment to the food serving station 400. The food serving station 450 may be substantially similar to the food serving station 400 except as otherwise specified herein. The food serving station 450 includes a breath guard 360 substantially similar to the breath guard 360 of FIGS. 19 and 20.

Figure 26:
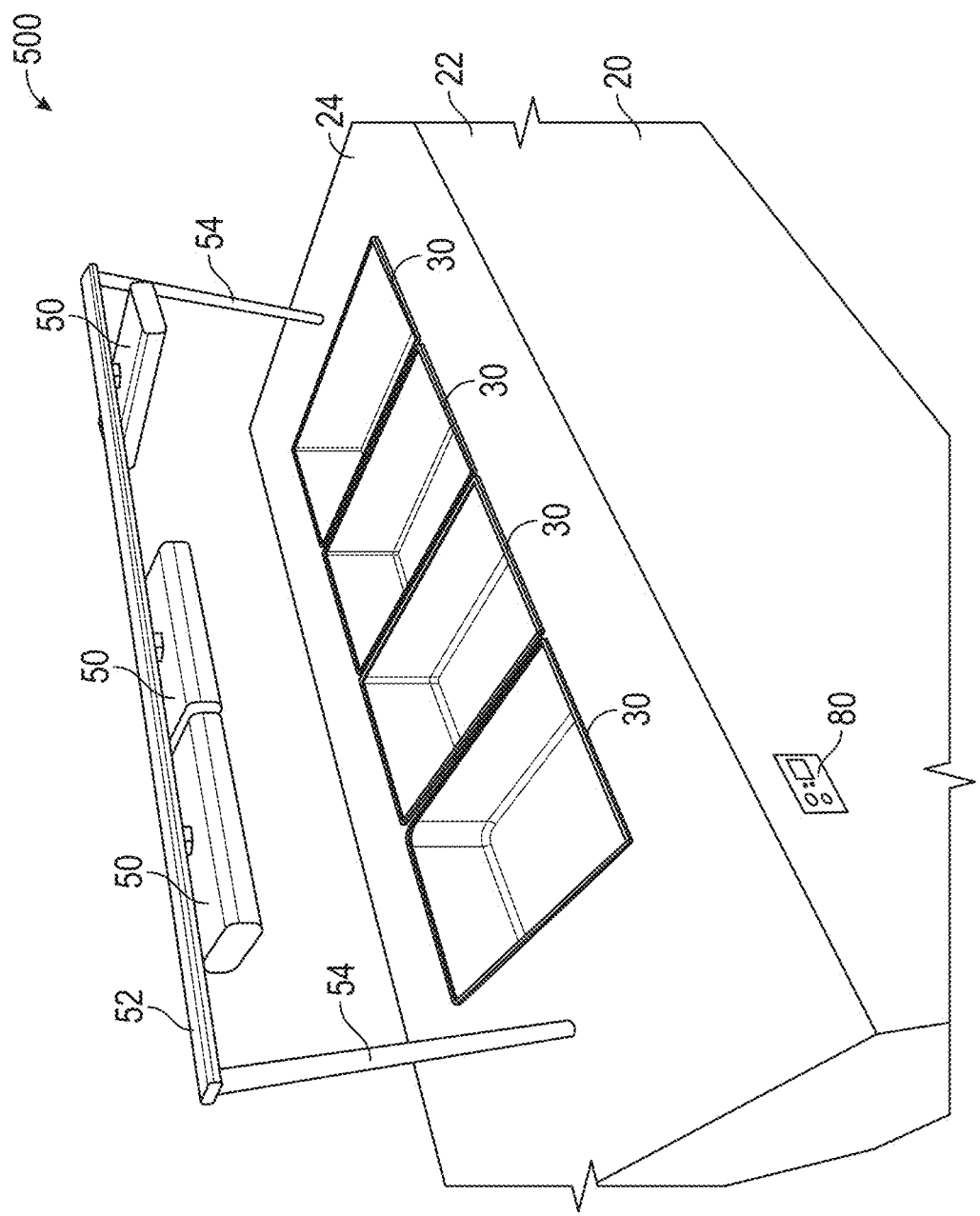
FIG. 26 is a perspective view of a food serving station, according to an exemplary embodiment.
Figure 27:
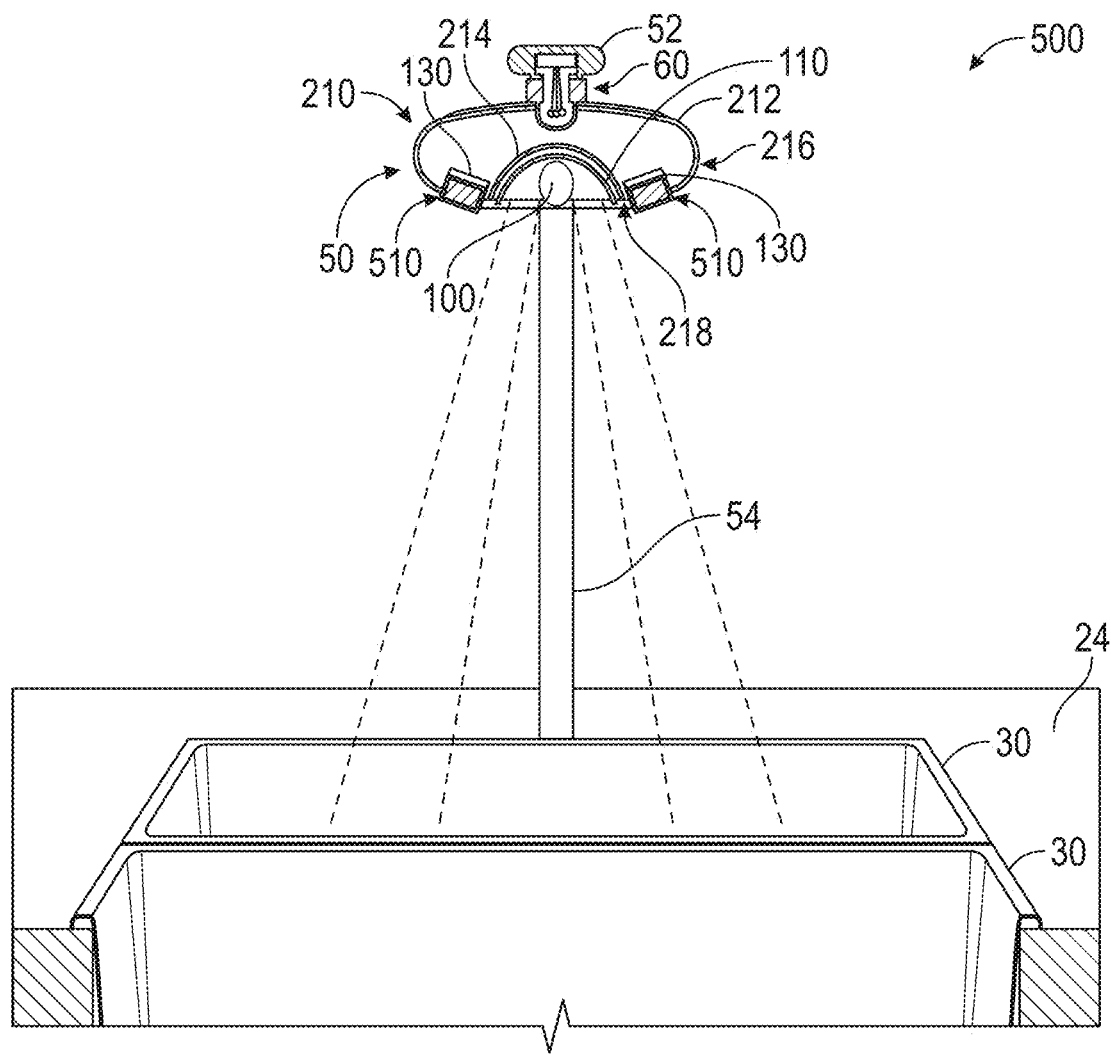
FIG. 27 is a side section view of the food serving station of FIG. 26.

Referring to FIGS. 26 and 27, a food serving station 500 is shown as an alternative embodiment to the food serving station 200. The food serving station 500 may be substantially similar to the food serving station 200 or the food serving station 400 except as otherwise specified herein. In this embodiment, the lighting slots 230 and the light sources 130 are omitted from the track 52, reducing the size of the track. Instead, each housing 210 defines a pair of lighting slots 510 each configured to receive a light source 130. The lighting slots 510 are defined by the outer wall 212 on opposite sides of the reflector 110. The light sources 130 illuminate an area similar to the area heated by the heating element 100. Accordingly, the illuminated area may be reconfigured by repositioning or reorienting the heat strip module 50. To accommodate the light sources 130 within the housing 210, additional electrical connections may be provided through the coupler 60 to couple the light sources 130 to the controller 70. Additionally, the volume 216 between the outer wall 212 and the inner wall 214 of the housing may be relatively large and/or filled with high quality insulation to limit heat transfer from the heating element 100 to the light sources 130.

Figure 28:
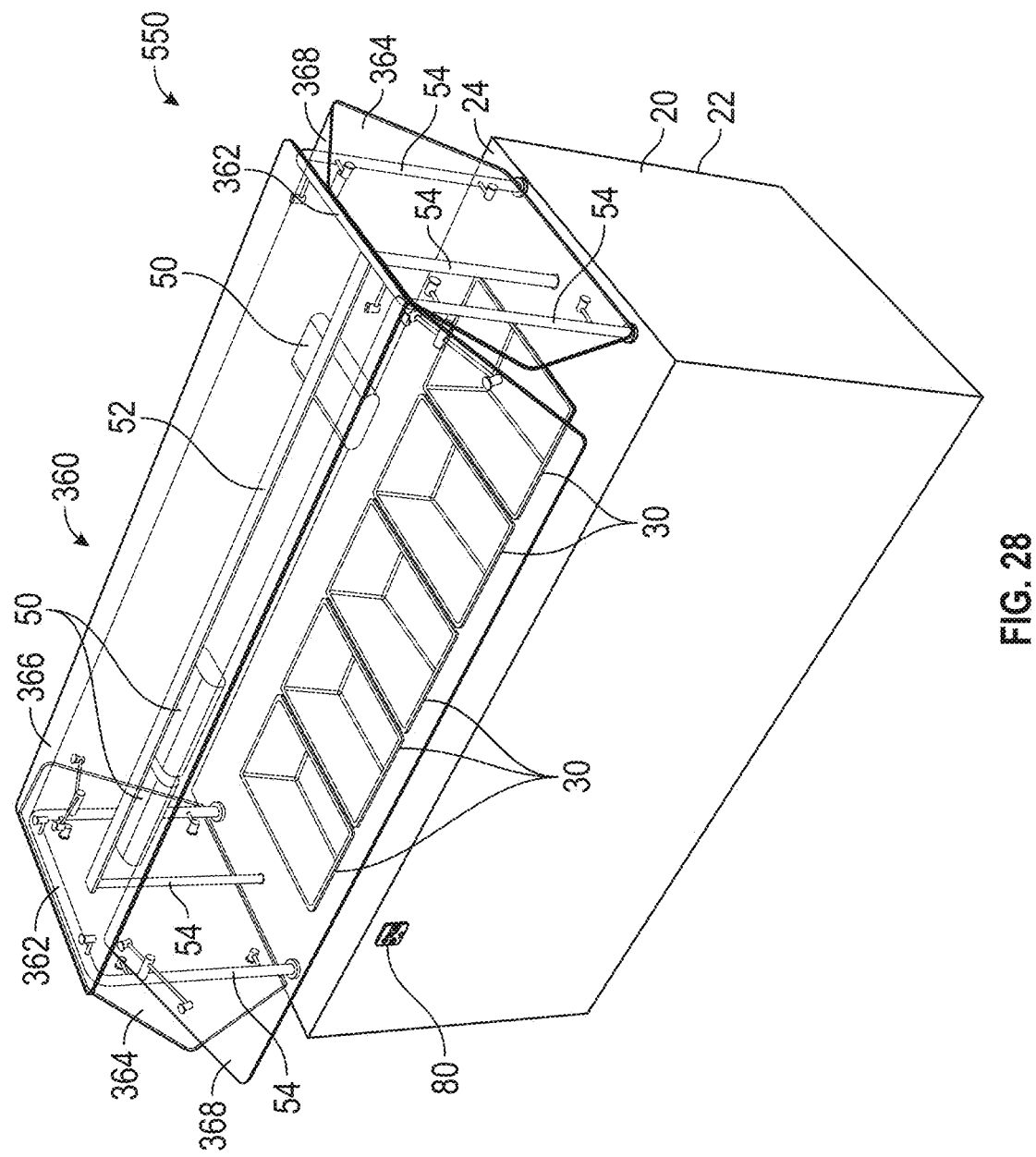
FIG. 28 is a perspective view of a food serving station including a breath guard, according to an exemplary embodiment.
Figure 29:
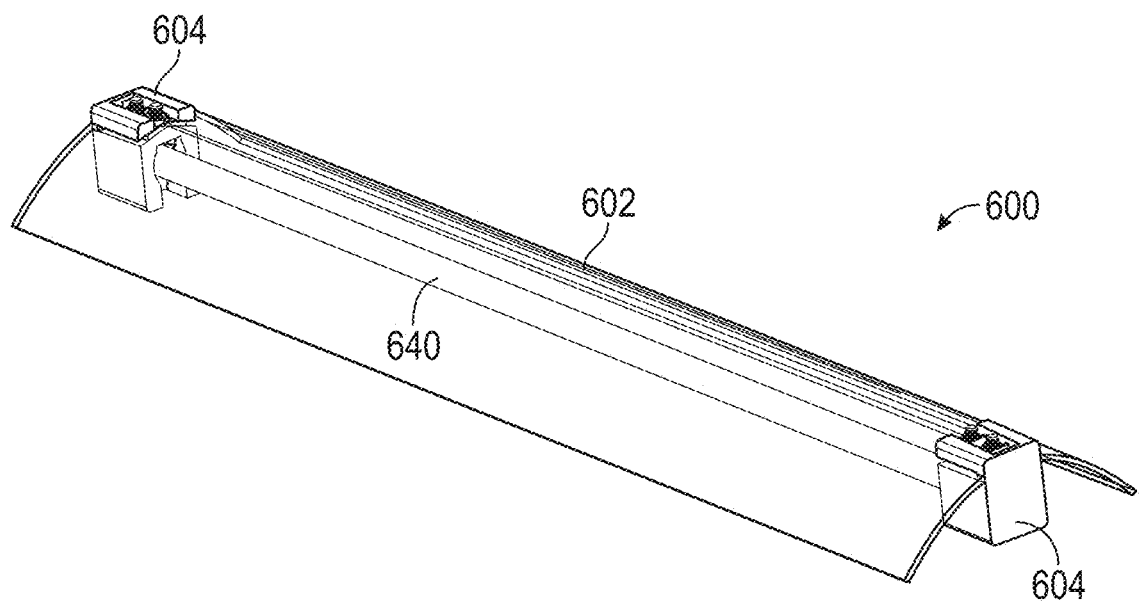
FIGS. 29-34 are various views of a heat strip module for a food serving station, according to an exemplary embodiment.
Figure 30:
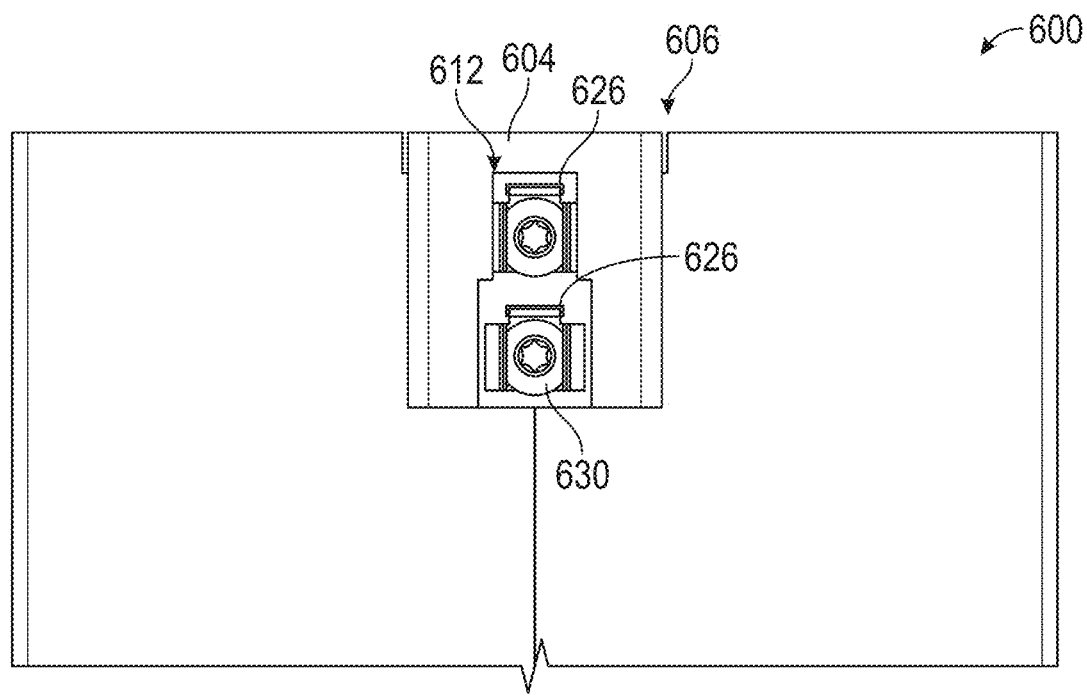
Figure 31:
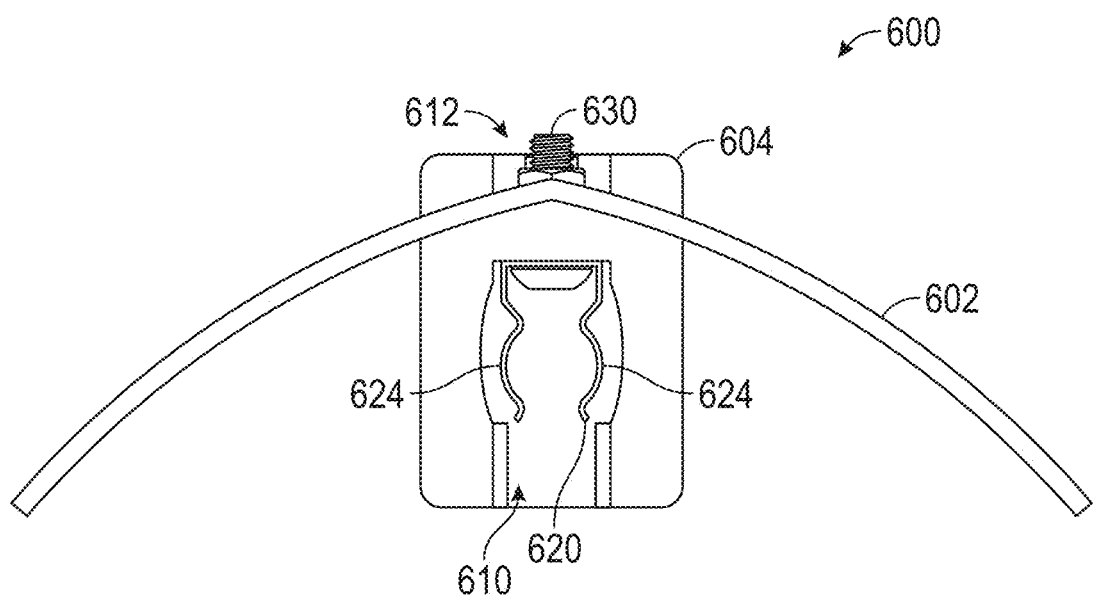
Figure 32:
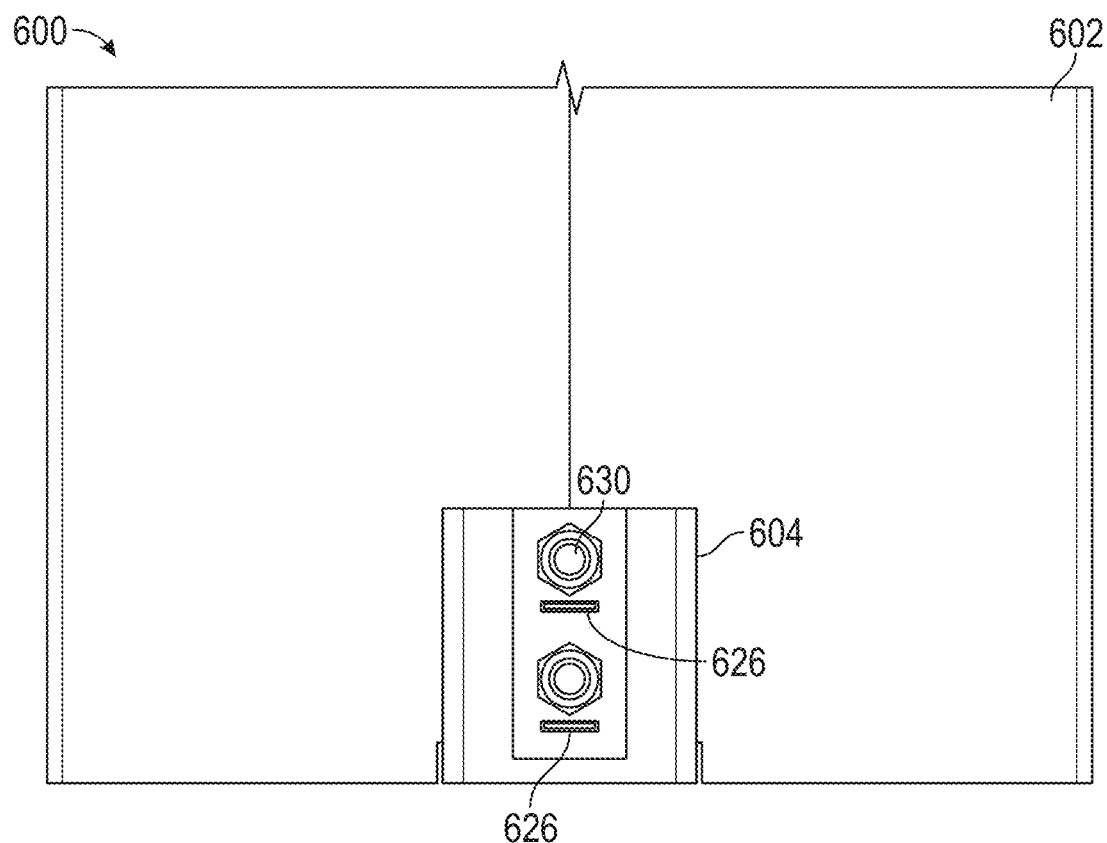
Figure 33:
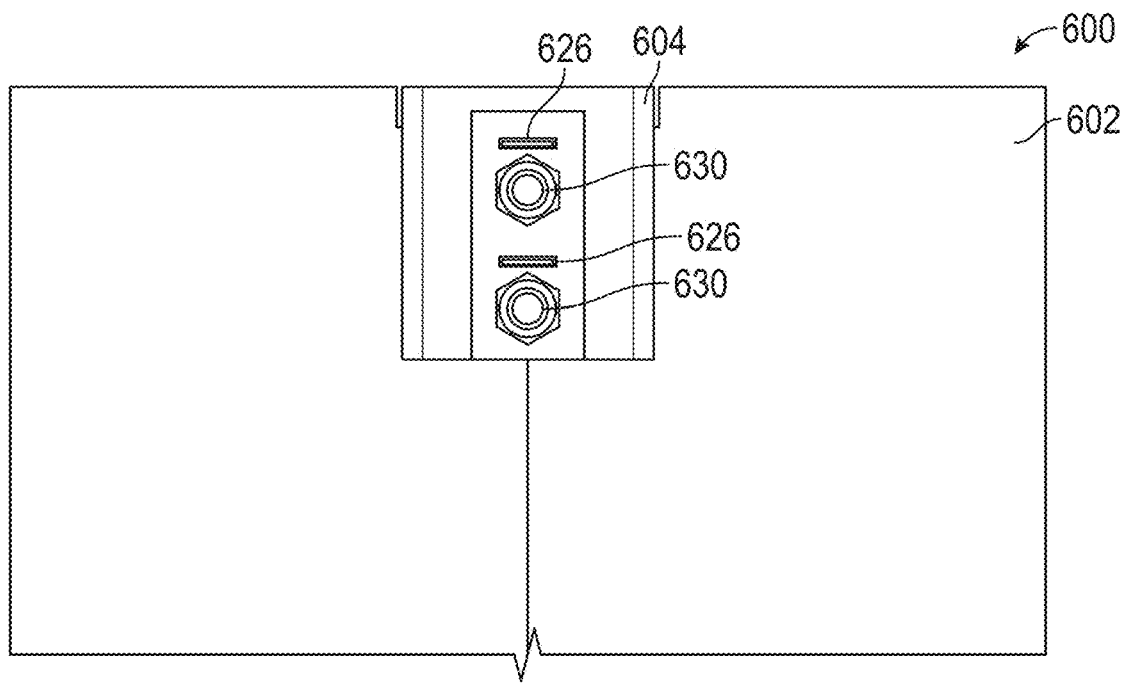
Figure 34:
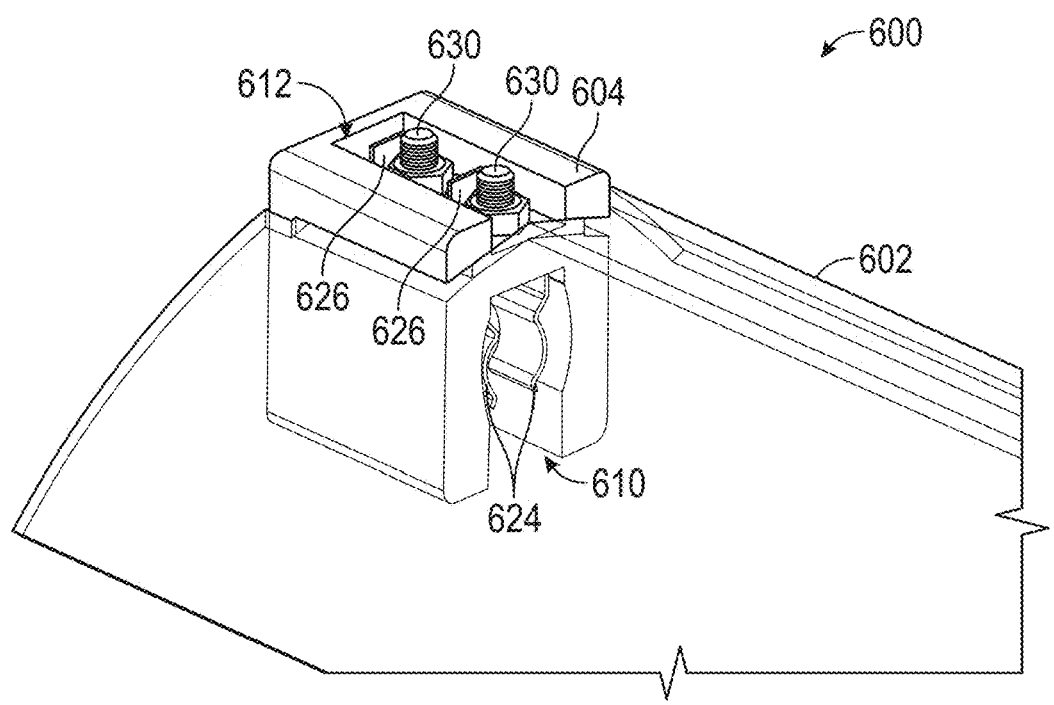

Referring to FIG. 28, a food serving station 550 is shown as an alternative embodiment to the food serving station 500. The food serving station 550 may be substantially similar to the food serving station 500 except as otherwise specified herein. The food serving station 550 includes a breath guard 360 substantially similar to the breath guard 360 of FIGS. 19 and 20. However, the food serving station 550 includes an additional set of uprights 54 that support the track 52, and the track 52 is separate from the breath guard 360. Accordingly, the breath guard 360 may be removed (e.g., for cleaning, for maintenance, etc.) without disturbing the track 52 and the heat strip modules 50.

In some embodiments, the heat strip modules 50 described herein with respect to one food station are interchangeable with those of another food station (e.g., of the same embodiment, of a different embodiment, etc.). By way of example, a user may remove one of the heat strip modules 50 from the food serving station 200 of FIG. 3 and install that heat strip module 50 in the track 52 of another food serving station 200. By way of another example, a user may remove one of the heat strip modules 50 from the food serving station 200 of FIG. 3 and install that heat strip module 50 into the track 52 of a food serving station 400 shown in FIG. 21.

Referring to FIGS. 29-34, a heating element assembly 600 (e.g., a heating element and reflector assembly, a heat strip module, etc.) is shown according to exemplary embodiment. The heating element assembly 600 may be used in any of the heat strip modules shown and/or described herein. Specifically, the heating element assembly may replace the heating element 100 and the reflector 110 of any of the heat strip modules 50. The heating element assembly 600 may be used anywhere that the heat strip module 50 is used (e.g., in the food serving station 10, etc.) as well as in an embodiment where the heating element assembly 600 is fixed in place (e.g., as part of a heat strip module 50 that is fixed relative to a base 20).

Figure 35:
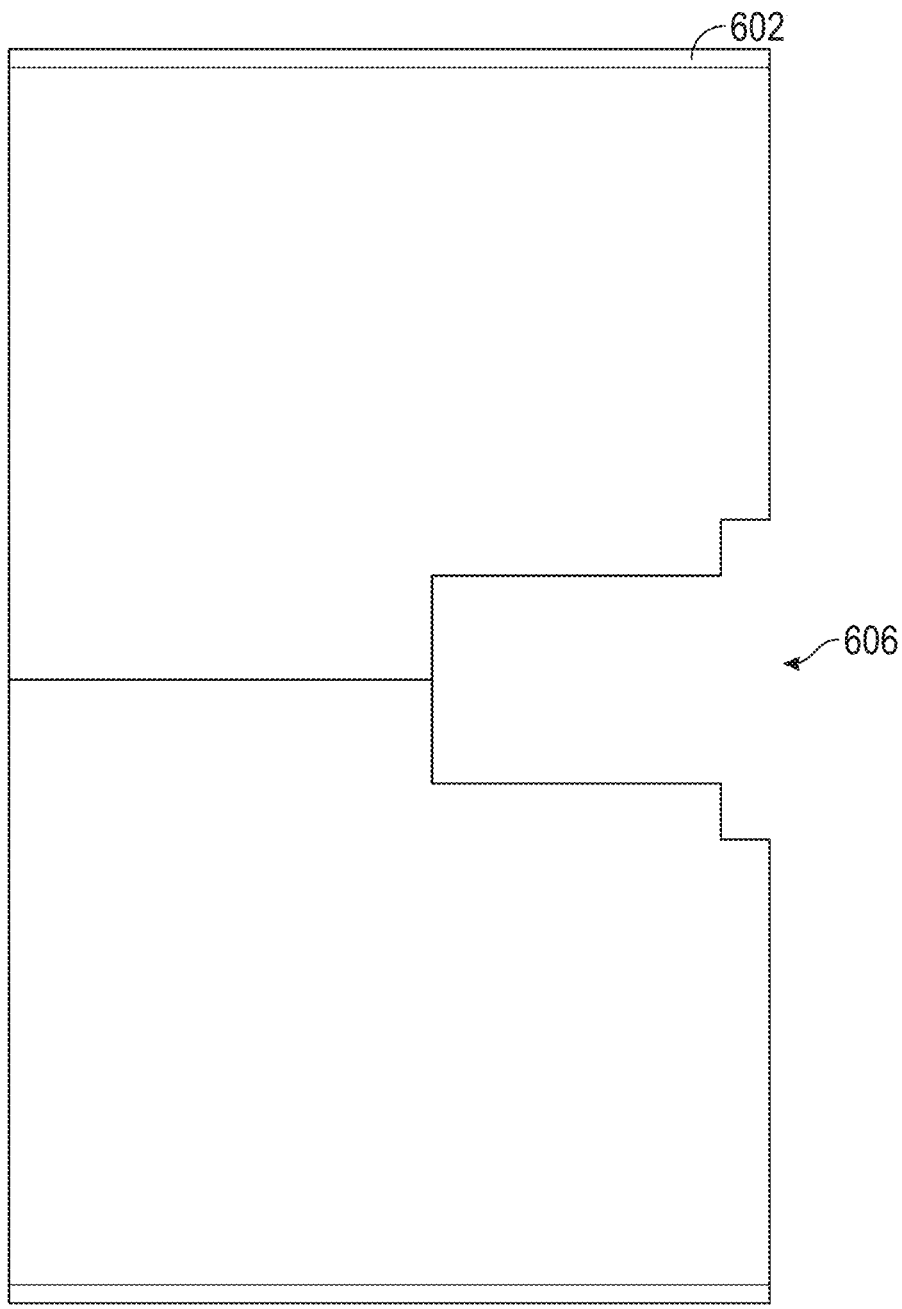
FIG. 35 is a top view of a reflector for the heat strip module of FIG. 29.

Referring to FIGS. 29-36, the heating element assembly 600 includes a concave plate or housing, shown as reflector 602, that extends along the length of the heating element assembly 600. The reflector 602 may be configured to reflect energy similarly to the reflector 110. A pair of bodies or mounts, shown as mounting blocks 604, are coupled to the reflector 602. The mounting blocks 604 are positioned at opposite ends of the reflector 602. Specifically, each end of the reflector 602 defines a slot, groove, or recess, shown as notch 606, configured to receive the mounting block 604. As shown in FIG. 35, an inner portion of the notch 606 has a first width, and an outer portion of the notch 606 has a second width greater than the first width. The mounting blocks 604 each define a pair of notches, grooves, or recesses, shown as slots 608. The slots 608 are positioned on opposite sides of the mounting block 604 and extend partway through a width of the mounting block 604 and partway through a longitudinal thickness of the mounting block 604. When the heating element assembly 600 is assembled, the mounting blocks 604 are slid onto the reflector 602 such that each notch 606 receives one of the mounting blocks 604 and the slots 608 receive the reflector 602. Specifically, the inner portion of the notch 606 receives the portion of the mounting block 604 defining the slots 608, and the outer portion of the notch 606 receives the thicker portion of the mounting block 604 that does not define the slots 608. Accordingly, each mounting block 604 is interlocked with the reflector 602 to couple the mounting blocks 604 to the reflector 602.

Figure 36:
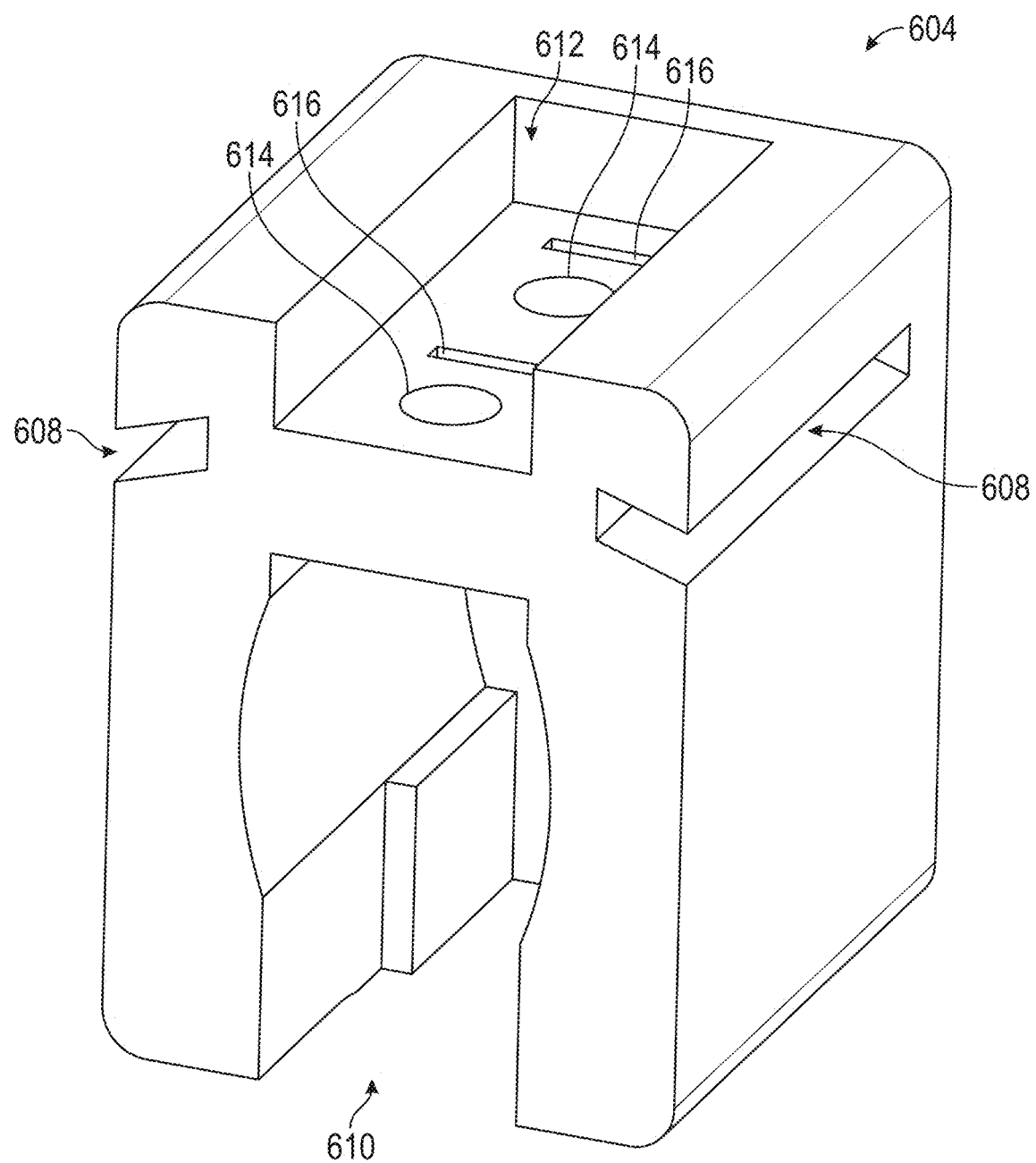
FIG. 36 is a perspective view of a mounting block for the heat strip module of FIG. 29.

Referring to FIG. 36, a bottom portion of the mounting block 604 defines a first recess, shown as heating element recess 610, and a top portion of the mounting block 604 defines a second recess, shown as connection recess 612. The heating element recess 610 faces upward, and the connection recess 612 faces downward. The heating element recess 610, the connection recess 612, and the slots 608 all face the same longitudinal direction (e.g., toward the center of the heating element assembly 600. A first pair of apertures, shown as fastener apertures 614, and a second pair of apertures, shown as power tab apertures 616, extend vertically through the mounting block 604 from the heating element recess 610 to the connection recess 612.

Figure 37:
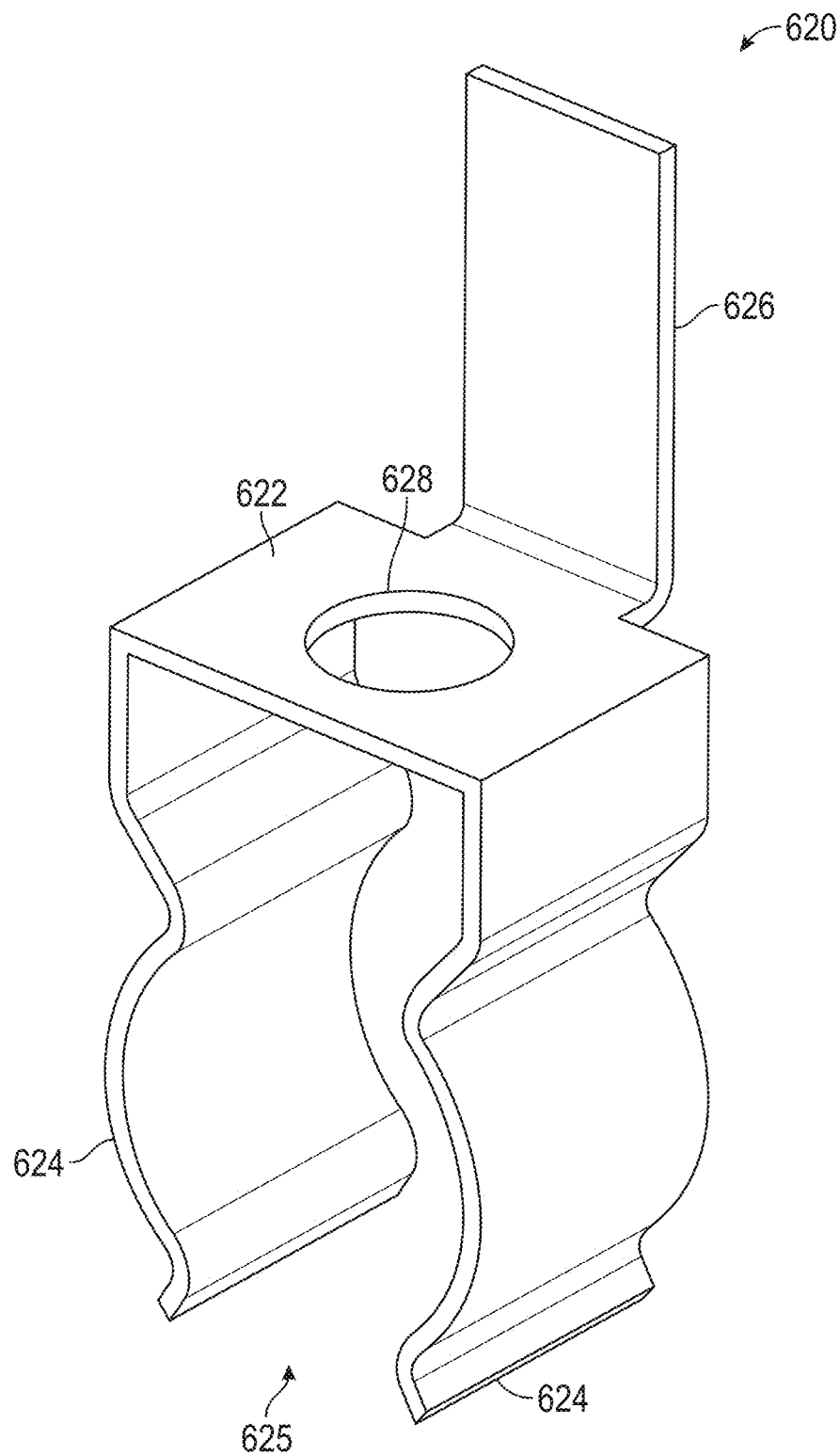
FIG. 37 is a perspective view of a clip for the heat strip module of FIG. 29.
Figure 38:
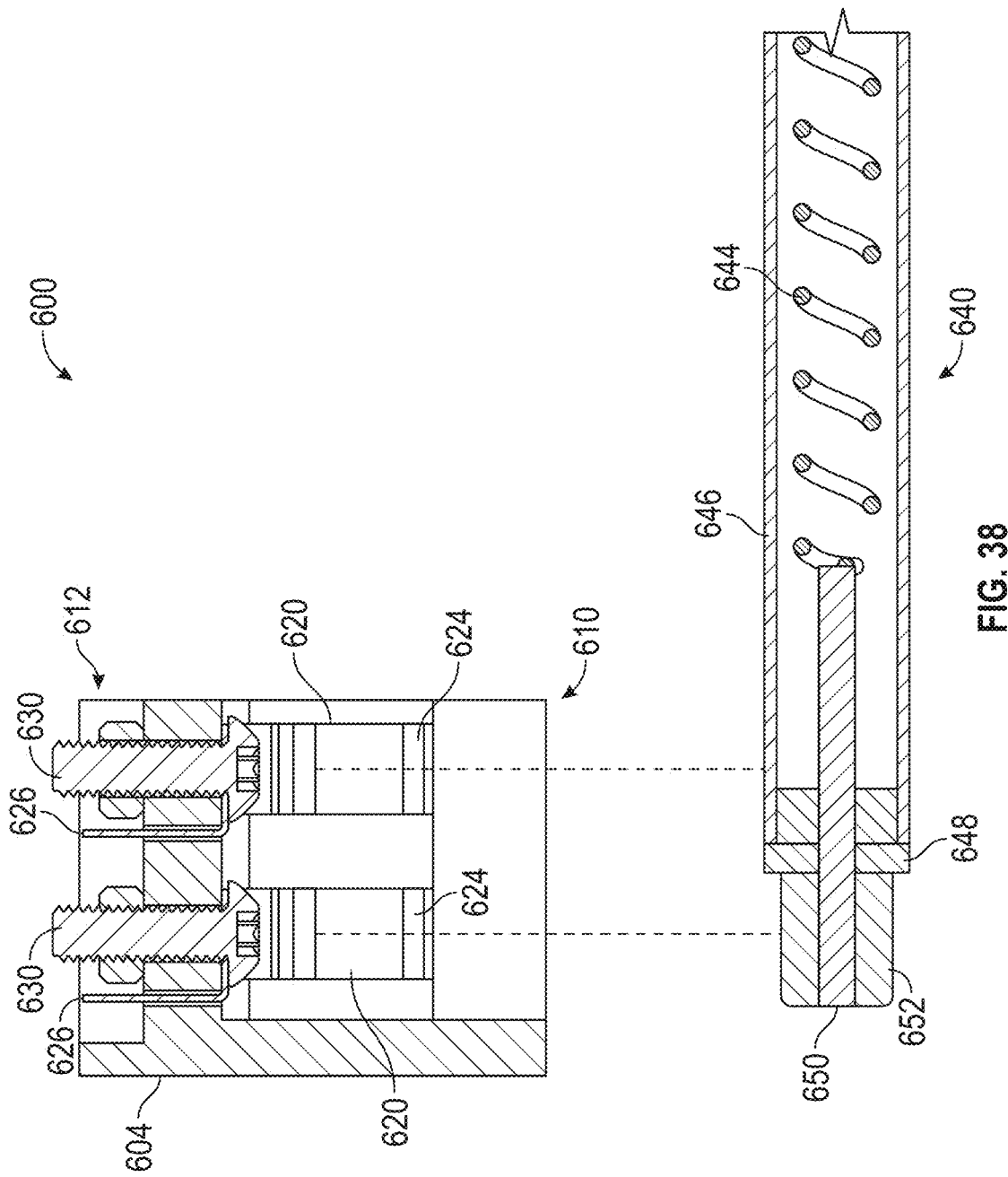
FIGS. 38 and 39 are side section views of the heat strip module of FIG. 29.
Figure 39:
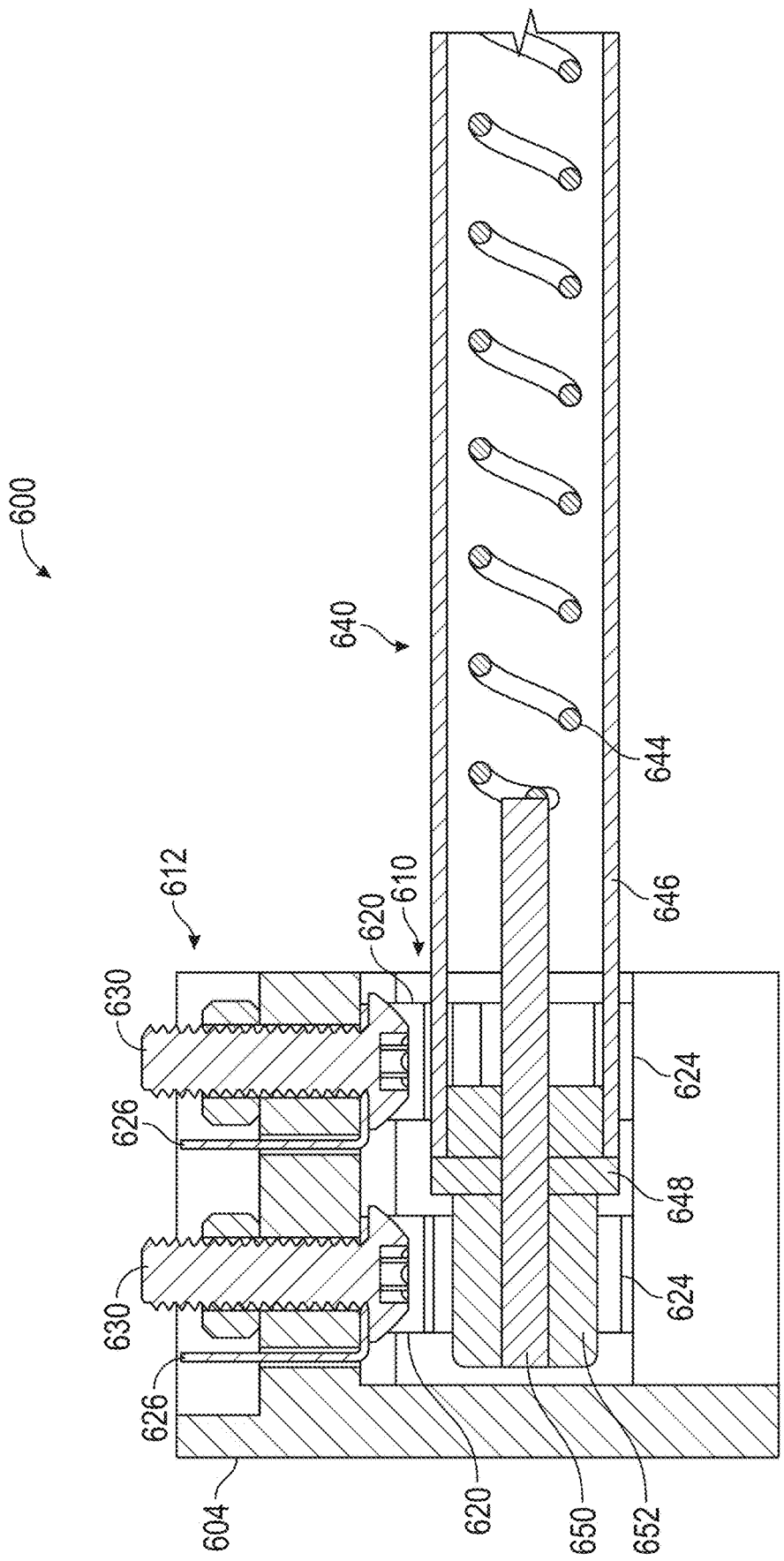
Figure 42:
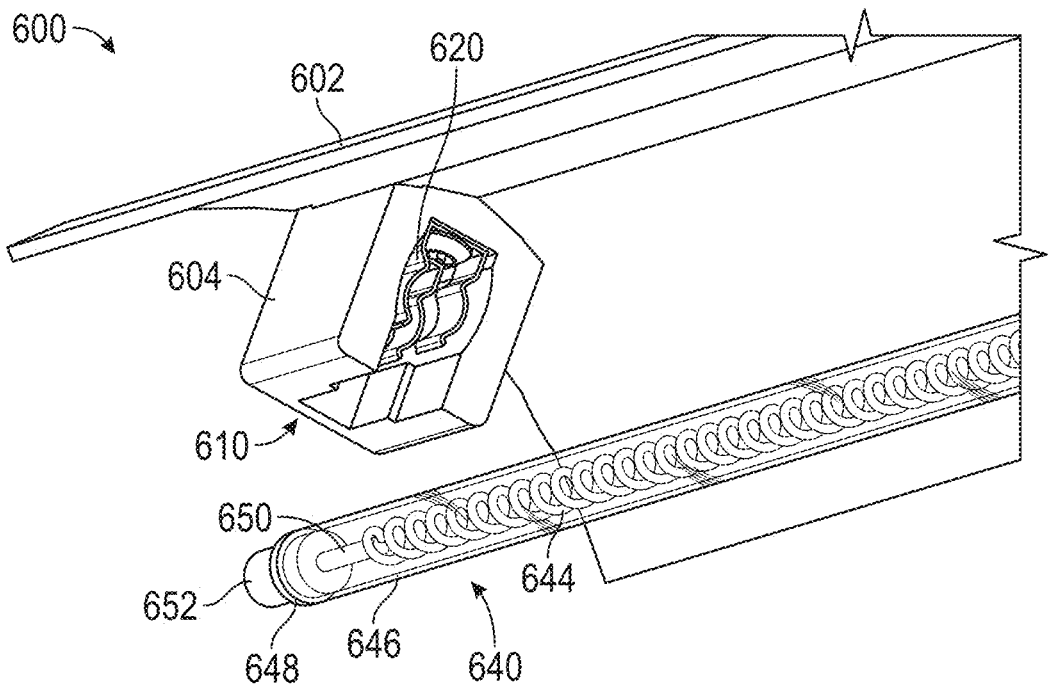
FIGS. 42-45 are various views of the heat strip module of FIG. 29.
Figure 43:
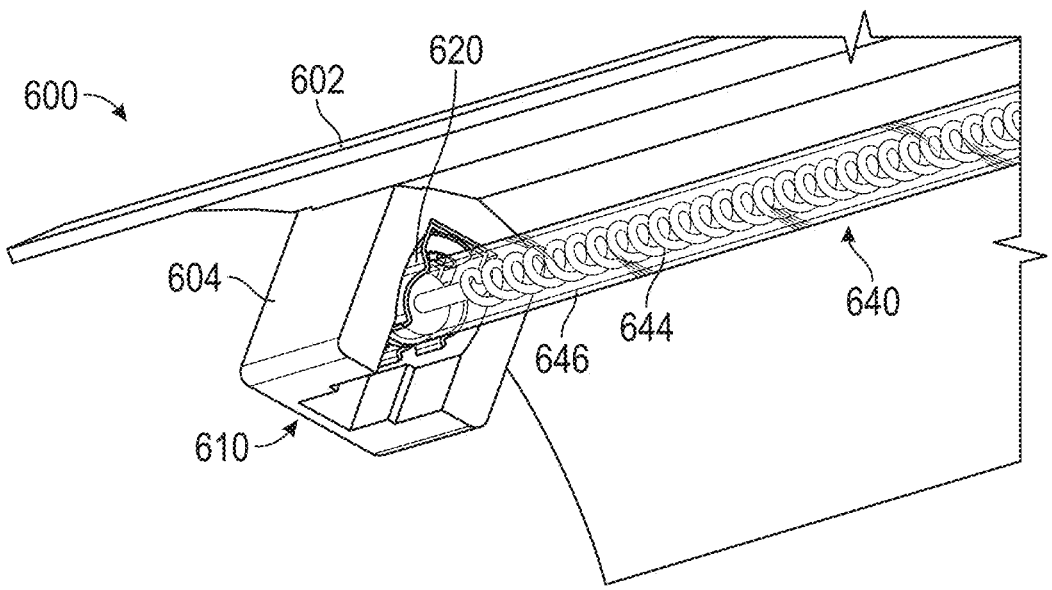
Figure 44:
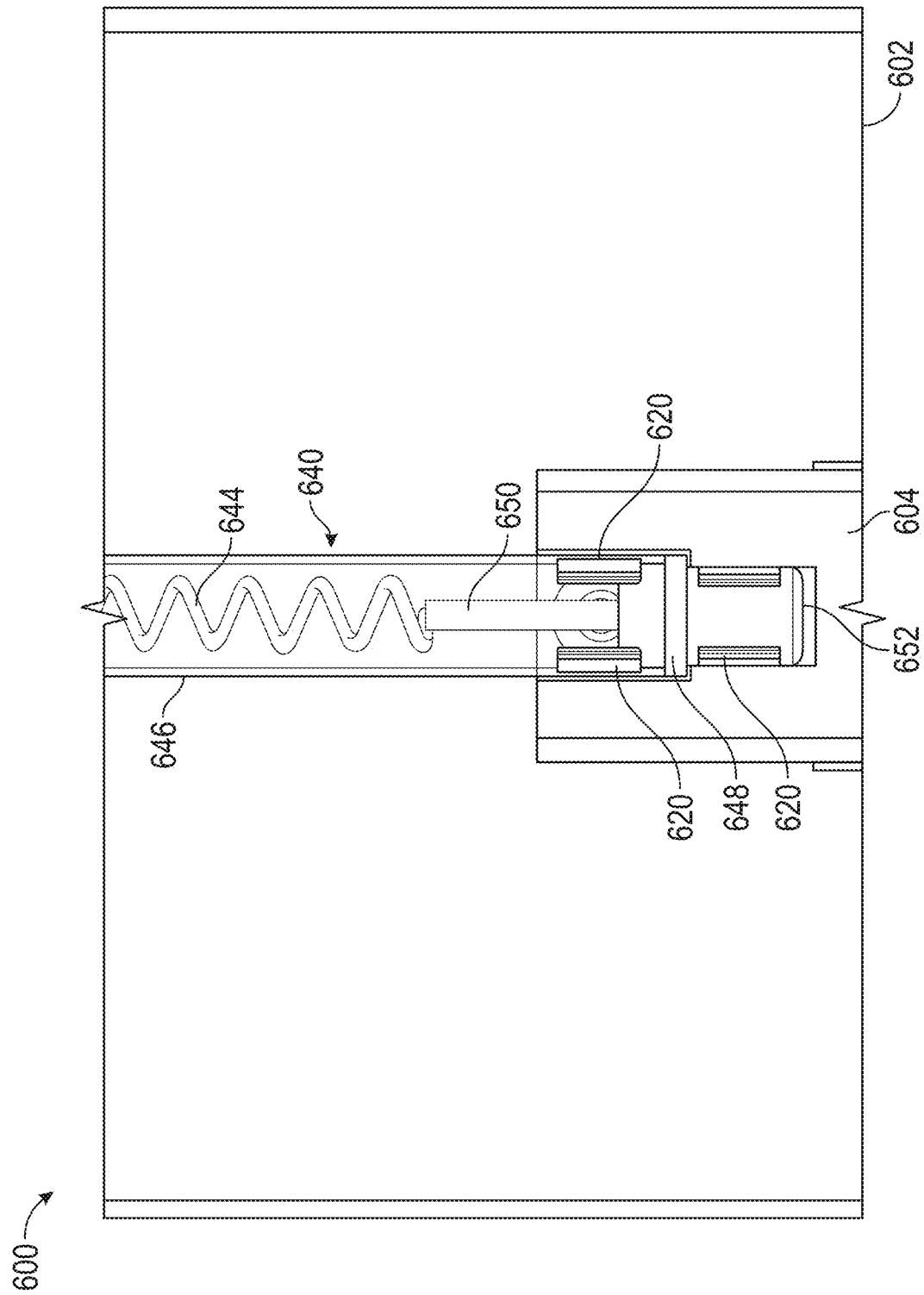
Figure 45:
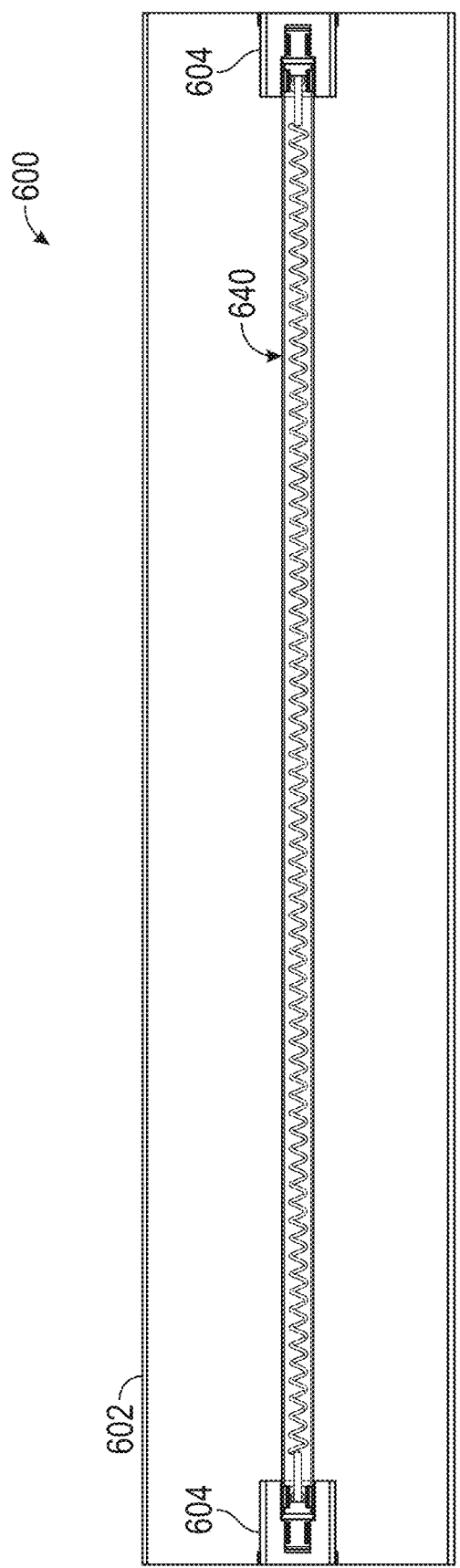

Referring to FIGS. 37 and 38, the heating element assembly 600 further includes two pairs of conductive receivers or couplers, shown as clips 620. The clips 620 may be made from a resilient and/or conductive material. Each clip 620 includes a base, shown as plate 622. A pair of curved members, projections, or tabs, shown as arms 624, extend downward from the plate 622. A recess 625 is defined between the arms 625 and the plate 622. A flat member, projection, or tab, shown as power tab 626, extends upward from the plate 622. An aperture, shown as fastener aperture 628, extends vertically through the plate 622.

Two of the clips 620 are coupled to each mounting block 604. When the heating element assembly 600 is assembled, the arms 624 and the plate 622 of each clip 620 are positioned within the heating element recess 610 of one of the mounting blocks 604. The power tabs 626 extend upward through the power tab apertures 616 and upward into the connection recess 612. Each fastener aperture 628 aligns with a fastener aperture 614, and a fastener 630 extends through each set of fastener apertures 614, 628 to couple the corresponding clip 620 to the mounting block 604. In some embodiments, the mounting block 604 includes an insulative material such that the clips 620 are electrically isolated from one another.

Referring to FIGS. 38-45, the heating element assembly 600 further includes a removable heating element assembly, shown as heating element 640. The heating element 640 is generally radially symmetric about a central longitudinal axis 642. The heating element 640 includes a helical or coiled heating element (e.g., a coil, a heater coil, etc.), shown as heating element 644, that extends along the central longitudinal axis 642. The heating element 644 is coiled about the central longitudinal axis 642. A tubular member, shown as sheath 646, receives the heating element 644, protecting the heating element 644 from outside contaminants. At each end of the sheath 646, the sheath 646 receives a plug, spacer, or isolator, shown as bushing 648. Extending through the center of each bushing 648 is a pin, connector, or conductor, shown as cold pin 650. One end of each cold pin 650 is coupled to an end of the heating element 644. An opposite end of each cold pin 650 extends beyond the bushing 648 and is received within a conductor or cylindrical end portion, shown as end cap 652. The end caps 652 have a smaller diameter than the sheath 646. The heating element 644, the sheath 646, the bushings 648, the cold pins 650, and the end caps 652 are all centered about and aligned with the longitudinal axis 642 (i.e., axially aligned).

The heating element 640 is coupled to the mounting blocks 604 by the clips 620. Specifically, the arms 624 of two of the clips 620 (e.g., the innermost clips 620) engage opposite end portions of the sheath 646 to couple the clips 620 to the sheath 646 and support the heating element 640. The arms 624 of the other two of the clips 620 (e.g., the outermost clips 620) engage the end caps 652 to couple the clips 620 to the end caps 652 (e.g., such that the end caps 652 are received within the recesses 625). The curved shapes of the arms 624 may facilitate retaining the heating elements 640 within the clips 620. The arms 624 may be biased into engagement with the heating element 640 (e.g., due to elastic deformation of the arms 624). The distance between the arms 624 may be sized to facilitate this biasing. In some embodiments, the arms 624 of the outermost clips 620 are positioned closer together than the arms 624 of the innermost clips 620 (e.g., to accommodate the larger diameter of the sheath 646).

In operation, a continuous electrical path is formed between the two outermost clips 620, the end caps 652, the cold pins 650, and the heating element 644. The bushings 648 may include an insulative material to electrically isolate the sheath 646 from this path. An energy source (e.g., the power source 90) is selectively electrically coupled to the power tabs 626 of the outermost clips 620 such that an electrical current selectively flows along this path (e.g., as controlled by the controller 70). The heating element 644 has a relatively high resistance such that this current causes the heating element 644 to increase in temperature and emit energy (e.g., in the form of infrared light). The sheath 646 absorbs a portion of (e.g., most of) this energy and increases in temperature, emitting energy (e.g., in the form of infrared light). This energy is directed downward and away from the heating element assembly 600 by a reflective surface of the reflector 602. In some embodiments, the sheath 646 has a coating (e.g., an infrared coating) that facilitates the emission of certain types of energy (e.g., infrared energy).

In some embodiments, the density of the windings of the heating element 644 varies along the length of the central longitudinal axis 642. By way of example, a portion of the heating element 644 having a greater winding density (i.e., more windings per a given length) may emit relatively more energy than a portion having a lesser density. In some embodiments, a first portion and a second portion of the heating element 644 positioned at opposite ends of the heating element 644 have a greater winding density than a third portion between the first and second portions. This variation in density may increase the amount of energy emitted at the ends of the heating element 640 to make up for increased heat losses at the ends, providing overall more even heating.

The heating element 640 is selectively coupled to the mounting blocks 604 by the clips 620 such that the heating element 640 can be removed. By way of example, the heating element 640 may be coupled to the mounting blocks 604 by pressing the heating element 640 into the clips 620 until the arms 624 snap around the heating element 640. The heating element 640 may be removed by pulling the heating element 640 with sufficient force for the clips 620 to release the heating element 640. This process can be completed quickly, without significant skill, and without the use of tools (e.g., without the use of specialized tools, by hand, etc.). Because the heating element 640 may easily be removed and replaced, the heating element 640 may facilitate cleaning the reflector 602 (e.g., by ensuring the reflector 620 can be accessed without obstruction by the heating element 640). The removable arrangement of the heating element 640 also facilitates replacement of the heating element 640 if the heating element 640 becomes damaged or breaks down over time.

In some embodiments, one or more of the heat strip modules described herein (e.g., the heat strip module 50, the heating element assembly 600, etc.) is additionally or alternatively configured to perform another function beyond providing thermal energy. In some embodiments, the module includes a cooler (e.g., a fan, a refrigeration circuit, a cold air blanket device, etc.) that is configured to provide cooled air to an area below the module. In some embodiments, the module is configured to provide light (e.g., visible light, ultraviolet light for disinfectant purposes, etc.). In some embodiments, the modules do not include a heating element.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the food serving station as shown in the various exemplary embodiments is illustrative only. Additionally, any element disclosed in one embodiment may be incorporated or utilized with any other embodiment disclosed herein. For example, the heat strip modules 50 of the exemplary embodiment shown in FIG. 21 may be incorporated in the food serving station 200 of the exemplary embodiment shown in FIG. 3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A food station, comprising:
   a base configured to support a food product;
   a frame coupled to the base, the frame including a longitudinal member having a length extending in a longitudinal direction; and
   a heat strip module coupled to the longitudinal member, the heat strip module comprising:
      a housing;
      a heating element coupled to the housing and configured to emit energy to heat the food product, wherein the heating element has a length that extends along a main axis of the heating element from a first end of the heating element to a second end of the heating element and a width that is less than the length of the heating element; and
      a reflector coupled to the housing and configured to redirect a portion of the energy emitted by the heating element downward toward the food product,
   wherein the heat strip module is selectively rotatable relative to the longitudinal member about a substantially vertical axis between a first orientation in which the main axis of the heating element extends parallel to the longitudinal member and a second orientation in which the main axis of the heating element is not parallel to the longitudinal member, wherein the heat strip module is configured to emit the energy in both the first orientation and the second orientation, and wherein the substantially vertical axis is centered between the first end and the second end.

2. The food station of claim 1, wherein the heat strip module is selectively repositionable along the length of the longitudinal member between a first position and a second position and configured to emit the energy in both the first position and the second position.

3. The food station of claim 2, wherein the heat strip module is selectively coupled to the longitudinal member such that the heat strip module is selectively repositionable by decoupling the heat strip module from the longitudinal member in the first position and coupling the heat strip module to the longitudinal member in the second position.

4. The food station of claim 2, wherein the heat strip module is continuously repositionable along the length of the longitudinal member.

5. The food station of claim 1, wherein the heat strip module further comprises a light source coupled to the housing and configured to emit visible light toward the food product.

6. The food station of claim 1, further comprising a light source coupled to the longitudinal member and configured to emit visible light toward the food product.

7. The food station of claim 1, further comprising a second heat strip module removably coupled to the longitudinal member, wherein the second heat strip module is at least one of (a) selectively rotatable relative to the longitudinal member or (b) selectively repositionable along the length of the longitudinal member.

8. The food station of claim 1, further comprising:
   a user interface configured to receive an indication of a desired output level for the heat strip module from a user; and
   a controller operatively coupled to the user interface and the heat strip module and configured to vary an on time of the heating element within a predetermined time period to reach the desired output level.

9. The food station of claim 1, further comprising a breath guard assembly comprising:
   a pair of upright members coupled to the base and extending upward from the base; and
   a panel coupled to the upright members and extending between the upright members.

10. A food station, comprising:
    a base configured to support a food product;
    a frame coupled to the base, the frame including a longitudinal member having a length extending in a longitudinal direction; and
    a heat strip module coupled to the longitudinal member, the heat strip module comprising:
       a housing; and
       a heating element coupled to the housing and configured to emit energy to heat a heated area below the heat strip module, the heating element having a length and a width, wherein the length of the heating element is greater than the width of the heating element,
    wherein the heat strip module is selectively rotatable relative to the longitudinal member about a substantially vertical axis to vary an orientation of the heated area, and wherein the substantially vertical axis passes through a central portion of the heated area.

11. The food station of claim 10, wherein the heat strip module is rotatable about the substantially vertical axis between a first orientation and a second orientation that is offset 90 degrees from the first orientation.

12. A food station, comprising:
    a base configured to support a food product;
    a frame coupled to the base, the frame including a longitudinal member having a length extending in a longitudinal direction; and
    a heat strip module coupled to the longitudinal member, the heat strip module comprising:
       a housing;
       a heating element coupled to the housing and configured to emit energy to heat the food product has a length that extends along a main axis of the heating element from a first end portion of the heating element to a second end portion of the heating element and a width that is less than the length of the heating element; and
       a reflector coupled to the housing and configured to redirect a portion of the energy emitted by the heating element downward toward the food product,
    wherein the heat strip module is selectively repositionable along the length of the longitudinal member between a first position and a second position and configured to emit the energy in both the first position and the second position; and
    wherein the heat strip module is selectively rotatable relative to the longitudinal member about a substantially vertical axis, and wherein the substantially vertical axis passes through a central portion of the heating element that is positioned between the first end portion and the second end portion.

13. The food station of claim 12, wherein the heat strip module is continuously repositionable along the length of the longitudinal member between the first position and the second position.

14. The food station of claim 12, wherein the heating element is configured to heat an area below the heat strip module, the area having a length and a width, wherein the length of the area is greater than the width of the area.

15. The food station of claim 12, wherein the heating element extends parallel to a top surface of the base.

\* \* \* \* \*